United States Patent
Cronholm et al.

(10) Patent No.: US 10,542,402 B2
(45) Date of Patent: Jan. 21, 2020

(54) ABILITY TO DETECT PASSIVE BEACON RECEIVER DEVICES IN A SHORT-RANGE WIRELESS BEACON COMMUNICATION SYSTEM

(71) Applicant: CRUNCHFISH PROXIMITY AB, Malmö (SE)

(72) Inventors: Paul Cronholm, Malmö (SE); Joachim Samuelsson, Helsingborg (SE); Kristian Sylwander, Malmö (SE)

(73) Assignee: CRUNCHFISH PROXIMITY AB, Malmö (SE)

( * ) Notice: Subject to any disclaimer, the term of this patent is extended or adjusted under 35 U.S.C. 154(b) by 0 days.

(21) Appl. No.: 15/768,265

(22) PCT Filed: Oct. 13, 2016

(86) PCT No.: PCT/SE2016/050992
§ 371 (c)(1),
(2) Date: Apr. 13, 2018

(87) PCT Pub. No.: WO2017/065682
PCT Pub. Date: Apr. 20, 2017

(65) Prior Publication Data
US 2018/0310154 A1    Oct. 25, 2018

(30) Foreign Application Priority Data
Oct. 15, 2015 (SE) ...................................... 1551329

(51) Int. Cl.
*H04W 4/021*    (2018.01)
*H04W 4/80*    (2018.01)

(52) U.S. Cl.
CPC ............. *H04W 4/80* (2018.02); *H04W 4/021* (2013.01)

(58) Field of Classification Search
CPC ....... H04W 84/12; H04W 76/28; H04W 4/06; H04W 74/0833; H04W 8/005;
(Continued)

(56) References Cited

U.S. PATENT DOCUMENTS

| 2013/0182652 A1* | 7/2013 | Tong | H04W 72/0446 370/329 |
| 2013/0339438 A1* | 12/2013 | Cherian | H04W 4/08 709/204 |

(Continued)

FOREIGN PATENT DOCUMENTS

| WO | 2015149032 A1 | 10/2015 |
| WO | 2016026979 A1 | 2/2016 |

OTHER PUBLICATIONS

Extended Search Report and Written Opinion of Corresponding European application No. 16855852.6 dated Mar. 26, 2019, all enclosed pages cited.
(Continued)

*Primary Examiner* — Kwasi Karikari
(74) *Attorney, Agent, or Firm* — Burr & Forman, LLP

(57) ABSTRACT

A method for improving the ability to detect passive beacon receiver devices is disclosed. According to the method, a beacon communication system which comprises one or more short-range wireless beacon transmitter devices, at least one of which is configured to repeatedly transmit a short-range wireless beacon advertisement signal on a first beacon broadcast channel, is operated by causing a device among the short-range wireless beacon transmitter devices to temporarily transmit a short-range wireless beacon refresh signal on a second beacon broadcast channel. The beacon refresh signal is adapted to cause one or more short-range wireless beacon receiver devices being in a passive mode to enter into a short-range wireless beacon scanning mode.

15 Claims, 10 Drawing Sheets

(58) Field of Classification Search
CPC ........... H04W 52/028; H04W 52/0206; H04W 52/0274; H04W 74/06; H04W 76/10; H04W 88/08; H04W 68/00; H04W 72/0406; H04W 72/0446; H04W 28/08; H04W 48/10; H04W 48/18; H04W 48/20
See application file for complete search history.

(56) References Cited

U.S. PATENT DOCUMENTS

| | | |
|---|---|---|
| 2014/0135042 A1 | 5/2014 | Buchheim et al. |
| 2014/0220883 A1 | 8/2014 | Emigh et al. |
| 2015/0278867 A1 | 10/2015 | Lerman et al. |
| 2015/0289207 A1 | 10/2015 | Kubo et al. |

OTHER PUBLICATIONS

Office action from corresponding Swedish application No. 1551329-4 dated Apr. 5, 2016, all enclosed pages cited.
International Search Report and Written Opinion of PCT/SE2016/050992 dated Dec. 16, 2016, all enclosed pages cited.

* cited by examiner

ABILITY TO DETECT PASSIVE BEACON RECEIVER DEVICES IN A SHORT-RANGE WIRELESS BEACON COMMUNICATION SYSTEM

CROSS-REFERENCE TO RELATED APPLICATIONS

This patent application is a U.S. National Stage Application of PCT/SE2016/050992, which claims Paris convention priority from Swedish patent application 1551329-4, filed on Oct. 15, 2015, which applications are incorporated herein in their entirety by reference.

TECHNICAL FIELD

The present invention generally relates to the field of beacon communication system comprising one or more short-range wireless beacon transmitter devices and one or more short-range wireless beacon receiver devices. More specifically, the invention relates to a short-range wireless beacon communication system with improved ability to detect passive beacon receiver devices. The invention also relates to an associated communication device, and to an associated method.

BACKGROUND

Short-range wireless beacons are used at various sites, such as shops, restaurants, cultural venues and sport arenas, to attract attention from nearby users of mobile communication devices such as mobile terminals like smartphones or tablets. The abbreviated notion mobile devices will be used herein when referring to such mobile communication devices.

For instance, the iBeacon technology from Apple allows for mobile devices to understand their location on a microlocal scale, and also allows delivery of hyper-contextual content to the users of mobile devices based on their current location. The iBeacon technology is based on the Bluetooth Low Energy (BLE) standard, and more particularly on Generic Access Profile (GAP) advertising packets. There are several other kinds of short-range wireless beacon technologies, for instance AltBeacon, URIBeacon and Eddystone, which are also based on BLE and GAP.

A basic short-range wireless beacon system is shown in FIG. 1A. A beacon device $B_1$ repeatedly broadcasts a short-range wireless beacon advertisement signal $BA_1$ in a 31-byte GAP BLE packet. The beacon advertisement signal $BA_1$ contains a 128-bit universally unique identifier, UUID1. The beacon advertisement signal $BA_1$ also includes a 32-bit major/minor portion. A location or region associated with the beacon device $B_1$ is represented by the universally unique identifier UUID1, and in some implementations also by the major/minor portion. The universally unique identifier UUID1 can therefore be seen as a beacon broadcast channel upon which the beacon device $B_1$ makes local broadcasts intended for beacon receivers in the location or region associated with the beacon device $B_1$.

A conventional beacon device is typically static in the sense that it is permanently placed at a stationary location at a site for which beacon-triggered services are to be provided. Mobile devices nearby may receive the short-range wireless beacon advertisement signal $BA_1$ if they are within the proximity zone, i.e. range, of the beacon device $B_1$.

To this end, each mobile device is provided with an application program, app, which is configured to handle the received short-range wireless beacon advertisement signals, in this case signal $BA_1$, as addressed by the respective universally unique identifier contained in the signals, in this case the UUID1 transmitted by the beacon device $B_1$. These apps may be handled by the operating system of the mobile device in different modes. The most prominent mode is the active mode, in which the app executes in the foreground, and typically is capable to interact with the user of the mobile communication device and also to communicate with another device or a server via the short-range wireless beacon interface and/or another communication interface. In FIG. 1A, two mobile devices in the active mode are shown as $A_1$ and $A_2$. When, for instance, mobile device $A_1$ receives the beacon advertisement signal $BA_1$, the app in the mobile device $A_1$ may detect that the UUID1 is contained therein and use it together with the information in the major/minor portion as appropriate in some way which is beneficial to the user and/or the host of the beacon device $B_1$ and which often involves interaction between the app in the mobile device $A_1$ and a service provider SP over a communication network NW.

Examples of such beneficial use includes, without limitation, determining a current approximate position of the mobile device $A_1$ by retrieving a predefined position of the beacon device $B_1$ from the service provider SP or by cross reference with local lookup data, or retrieving a content from the service provider SP.

A mobile device where the app is in active mode is referred to as an active mobile device in this document. An active mobile device $A_1$, $A_2$ may receive and react to additional transmissions of the beacon advertisement signal $BA_1$ from the beacon device $B_1$; this may be useful for instance if the content associated with the host of the beacon device $B_1$ is updated or changed.

Furthermore, an active mobile device may receive and react to beacon advertisement signals from other beacon devices nearby, such as beacon device $B_2$ in FIG. 1A, provided that they are already within the proximity zone of the respective beacon device (see mobile device $A_2$ with respect to beacon device $B_2$ in FIG. 1A), or move closer to it (mobile device $A_1$ and beacon device $B_2$). This is so irrespective of whether the different beacon devices $B_1$ and $B_2$ broadcast on different channels (different UUIDs in the beacon advertisement signals), or on the same channel (same UUID, UUID1, in the beacon advertisement signals $BA_1$ and $BA_2$, like in FIG. 1A). It is to be noticed that the same UUID/same single beacon broadcast channel is very often used for different beacon devices hosted by the same host, such as within the same supermarket, arena, fastfood restaurant, etc.

The operating system of the mobile devices may also handle apps in a passive mode. A purpose of the passive mode is power preservation, since the mobile devices are typically powered by batteries and since it is a general technical ambition to maximize the operational time of a mobile device between successive charging sessions. In the passive mode, the app executes in the background or is only installed on the mobile device.

Transitions between active mode and passive mode may be based on user interaction, user preference settings in the app or the operating system, or program logic in the app or the operating system.

A mobile device where the app is in passive mode is referred to as a passive mobile device in this document. In the passive mode, the app typically cannot interact with the user via the user interface, nor communicate with a server or another device—except for the following. Just like active mobile devices, a nearby passive mobile device (such as $P_1$ in FIG. 1A) may receive a short-range wireless beacon advertisement signal (such as $BA_1$) if it is within the proximity zone of the beacon device in question (e.g. $B_1$). However, unlike active mobile devices, after a short beacon scanning mode during which the beacon device $B_1$ is discoverable and also communication with server or another device is possible, and unless it switches to active mode, the passive mobile device $P_1$ will not be able to react to additional transmissions on the beacon broadcast channel UUID1 from the beacon device $B_1$. Instead, after the short beacon scanning mode (which typically lasts for some seconds, such as about 10 seconds), the passive mobile device $P_1$ will be "deaf" to, i.e. ignore, additional transmissions on the beacon broadcast channel UUID1 for as long as it stays in passive mode and continues to detect any advertisement on the beacon broadcast channel UUID1, for instance because it remains within the proximity zone of the beacon device $B_1$ and continues to detect its beacon advertisement signal $BA_1$. Only once the passive mobile device $P_1$ has not received the beacon advertisement signal $BA_1$, or any other communication, on the beacon broadcast channel UUID1 for a certain time, such as 1-15 minutes, the passive mobile device $P_1$ will again be susceptive of the beacon advertisement signal $BA_1$, or any other communication, on the beacon broadcast channel UUID1.

The present inventors have identified several problems associated with the above.

It is a problem for the host of the beacon device $B_1$, since it will prevent the host from advertising for new or updated content. It is also a problem to the passive mobile device $P_1$, since it will be deprived of an opportunity to react on the beacon advertisement signal $BA_1$ on the beacon broadcast channel UUID1 during the period when it is "deafened out".

This also means that when there are several beacon devices nearby, a passive mobile device will be locked to the beacon device (or more specifically, to its beacon broadcast channel UUID1) which it first discovered for as long as it stays within that beacon device's proximity zone. In the example of FIG. 1A, the passive mobile device $P_1$ has first discovered the first beacon device $B_1$. It then moves towards and enters into the proximity zone of the second beacon device $B_2$ while remaining within reach of the first beacon device $B_1$. Since the two beacon devices $B_1$ and $B_2$ broadcast their beacon advertisement signals $BA_1$ and $BA_2$ on the same beacon broadcast channel (same UUID1), the passive mobile device $P_1$ will not be able to discover the second beacon device $B_2$ and react to its beacon advertisement signal $BA_2$.

This is, again, problematic both from the point of view of the passive mobile device $P_1$ itself and for the host of the second beacon device $B_2$, for the reasons explained above. In addition to this, the host of the second beacon device $B_2$ will not be able to track the movement of the passive mobile device $P_1$ and broadcast an adapted service offer to the user of the passive mobile device $P_1$ as a result of the movement (such as, for instance, offering a first content when the user is in a first subarea where the first beacon device $B_1$ is located and a different, second content when the user is in a second subarea where the second beacon device $B_2$ is located).

Moreover, if the app in the passive mobile device uses beacon-based localization functionality, the passive mobile device will not be able to update its estimated location caused by the movement, since the second beacon device $B_2$ will not be detected when the passive mobile device $P_1$ is still within range of the first beacon device $B_1$.

In recent time, applications have been introduced which are based on mobile beacon devices rather than stationary. For instance, the present applicant has taken leadership in developing a new beacon-based technology which considerably facilitates for users of mobile devices which are proximate to each other to interact by, for instance, sharing content or conducting social media interaction.

The technology, which can be referred to as a "bubble" concept, is based on short-range wireless beacon broadcast messaging for establishing a dynamic, proximity-based network. Interaction between the users of the mobile devices in the network is supported by broadband communication with a server. Details are disclosed in the Swedish patent applications SE 1451203-2 "COMMUNICATION DEVICE FOR IMPROVED SHARING OF CONTENT", SE 1400535-9 "SELECTIVE USER INTERACTION IN A DYNAMIC, PROXIMITY-BASED GROUP OF WIRELESS COMMUNICATION DEVICES", SE 1451433-5 "DYNAMIC TIMING FOR IMPROVED COMMUNICATION HANDLING BETWEEN COMMUNICATION DEVICES", SE 1451509-2 "COMMUNICATION DEVICE FOR IMPROVED ESTABLISHING OF A CONNECTION BETWEEN DEVICES" and SE 1550486-3 "TEMPORARY PROXIMITY BASED LICENSE FOR APPLICATION ACCESS", the contents of which are incorporated herein in their entirety.

A short-range wireless beacon system based on mobile beacon devices is shown in FIG. 1B. While it can generally be used for various different purposes, the system in FIG. 1B is advantageously used for implementing the above-mentioned bubble concept. To this end, each mobile device $A_1$, $A_2$, $A_3$, $P_1$ is provided with an app which (together with the operating system and hardware in the mobile device) is configured to handle transmission as well as reception of short-range wireless beacon advertisement signals. Hence, unlike the basic static beacon system in FIG. 1A, in the bubble system of FIG. 1B, each mobile device can act as a beacon transmitting device as well as a beacon receiving device. In FIG. 1B, the mobile device $A_1$ is in active mode and repeatedly broadcasts its short-range wireless beacon advertisement signal $BA_1$, containing the 128-bit universally unique identifier UUID1 as a beacon broadcast channel indicator and a device identifier uidA1 within the 32-bit major/minor portion of the beacon advertisement signal.

Other active mobile devices $A_2$, $A_3$ within the proximity zone $PZ_1$ of the mobile device $BA_1$ can receive the beacon advertisement signal $BA_1$, read the UUID1 and the uidA1, and as a result contact a system server SS over a communication network NW. The app in the receiving mobile device may decide, for instance based on user interaction, user preference settings and/or program logic in the app, to join the bubble of the mobile device $A_1$, wherein the system server SS will register the receiving mobile device as belonging to the bubble of the mobile device $A_1$. This is seen for the active mobile devices $A_2$ and $A_3$ in FIG. 1B. The users of the bubble members $A_1$-$A_3$ may then, for instance, share content or conduct social media interaction supported by a system server SS and/or a service provider SP over the communication network NW.

There may also be passive mobile devices within the proximity zone $PZ_1$ of the active mobile device $A_1$. This is seen for a passive mobile device $P_1$ in FIG. 1B. The passive mobile device $P_1$ will also receive the beacon advertisement signal $BA_1$ on the UUID1 channel. However, if the mobile device $P_1$ remains in passive mode, it will not be able to react to additional transmissions on the beacon broadcast channel UUID1 from the active mobile device $A_1$ for the reasons explained above with respect to FIG. 1A. The passive mobile device $P_1$ will therefore not be susceptive of additional transmissions of the beacon advertisement signal $BA_1$ from the active mobile device $A_1$ for as long as it stays within its proximity zone $PZ_1$.

This problematic situation is complicated further by the fact that in a bubble system, all active mobile devices are potential senders as well as receivers of beacon advertisement signals. As seen in FIG. 1C, the other active mobile devices $A_2$ and $A_3$ may also send respective beacon advertisement signal $BA_2$ and $BA_3$ to generate a respective bubble of nearby mobile devices within their respective proximity zones $PZ_2$ and $PZ_3$. These transmissions typically occur on the same common beacon broadcast channel UUID1, wherein the transmissions are individualized by including a respective device identifier uidA2 and uidA3 within the 32-bit major/minor portion of the respective beacon advertisement signal $BA_2$ and $BA_3$.

While the active mobile devices $A_1$ and $A_3$ may react to the beacon advertisement signal $BA_2$ and hence join the bubble of the active mobile devices $A_2$ (and correspondingly for the active mobile devices $A_1$ and $A_2$ with respect to the active mobile device $A_3$), this is not so for the passive mobile device $P_1$ since it has already detected the beacon advertisement signal $BA_1$ of the first active mobile device $A_1$ and thus been deafened out on the beacon broadcast channel UUID1.

A problem from the point of view of the passive mobile device $P_1$ is that it will not have any opportunity to hear the beacon advertisement signals $BA_2$ or $BA_3$ on the common beacon broadcast channel UUID1 and as a result not be given any opportunity to join other bubbles than the bubble of the first active mobile device $A_1$. A problem from the point of view of the active mobile devices $A_2$ and $A_3$ is correspondingly that they will not be aware of the presence of the passive mobile device $P_1$ within their proximity zones $PZ_2$ and $PZ_3$, nor announce their availability as bubble creators to the passive mobile device $P_1$.

As is clear from the above descriptions of the exemplifying situations in FIGS. 1A-1C, the present inventors have identified several problem with beacon systems of the prior art, both ones that are based on one or more static beacon devices, and those that are based on mobile beacon devices.

One possible solution that could have been considered by those of ordinary skill in the art would be to use difference beacon broadcast channels for the different beacon devices. Beacon device $B_1$/active mobile device $A_1$ would use a first beacon broadcast channel UUID1, beacon device $B_1$/active mobile device $A_2$ would use a second beacon broadcast channel UUID2, active mobile device $A_3$ would use a third beacon broadcast channel UUID3, and so on. However, this is not attractive for manufacturers of operating systems for mobile devices, since it would require enormous resources to allocate unique beacon broadcast channels to all possible beacon devices/mobile devices. In reality, an operating system manufacturer typically only allows for a few different UUIDs to be used by a certain mobile device app, which renders this solution clearly unfeasible.

Another possible solution that could have been considered by those of ordinary skill in the art would be to use push messages from a central instance via a network, such as the service provider SP or system server SS via the communication network NW in FIGS. 1A-1C, to reach all mobile devices in a certain proximity zone. This would however have several disadvantages in itself. All mobile devices would have to monitor for such push messages on a frequent basis, which would require both modification of all mobile devices and increase of the power consumption. Adding a push notification service would require registering the app to push notification and also implementing some appropriate push notification code at the back end of the system, which of course has an expense. Also, uncertainty as regards when the user can be reached by a notification in time would be introduced, since push notification messages cannot be guaranteed to arrive.

As will be clear from the following description, the present inventors have instead invented a different solution which will solve, eliminate, alleviate, mitigate or reduce at least some of the problems referred to above.

SUMMARY

It is accordingly an object of the invention to offer improvements in the technical field of short-range wireless beacon communication systems, and to solve, eliminate, alleviate, mitigate or reduce at least some of the problems referred to above.

One aspect of the present invention is a beacon communication system comprising one or more short-range wireless beacon transmitter devices, wherein a device among the short-range wireless beacon transmitter devices is configured to repeatedly transmit a short-range wireless beacon advertisement signal on a first beacon broadcast channel, and wherein a device among the short-range wireless beacon transmitter devices is configured to temporarily transmit a short-range wireless beacon refresh signal on a second beacon broadcast channel, the beacon refresh signal being adapted to cause one or more short-range wireless beacon receiver devices being in a passive mode to enter into a short-range wireless beacon scanning mode.

Hence, a beacon communication system with improved ability to detect passive beacon receiver devices has been provided.

Another aspect of the present invention is a method of operating a beacon communication system which comprises one or more short-range wireless beacon transmitter devices, at least one of which is configured to repeatedly transmit a short-range wireless beacon advertisement signal on a first beacon broadcast channel. The method involves causing a device among the short-range wireless beacon transmitter devices to temporarily transmit a short-range wireless beacon refresh signal on a second beacon broadcast channel, the beacon refresh signal being adapted to cause one or more short-range wireless beacon receiver devices being in a passive mode to enter into a short-range wireless beacon scanning mode.

Accordingly, a method of operating a beacon communication system with improved ability to detect passive beacon receiver devices has been provided.

Still another aspect of the present invention is a communication device comprising a controller and a short-range wireless beacon transmitter, wherein the controller is configured to cause the beacon transmitter to repeatedly transmit a short-range wireless beacon advertisement signal on a first beacon broadcast channel, and temporarily suspend transmission on the first beacon broadcast channel and instead transmit a short-range wireless beacon refresh signal on a second beacon broadcast channel, the beacon refresh signal being adapted to cause one or more short-range wireless beacon receiver devices being in a passive mode to enter into a short-range wireless beacon scanning mode.

As a result, a communication device suitable for use in a beacon communication system with improved ability to detect passive beacon receiver devices has been provided.

Other aspects, objectives, features and advantages of the disclosed embodiments will appear from the following detailed disclosure, from the attached dependent claims as well as from the drawings. Generally, all terms used in the claims are to be interpreted according to their ordinary meaning in the technical field, unless explicitly defined otherwise herein.

All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly stated.

DETAILED DESCRIPTION

The disclosed embodiments will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

Figure 1A:
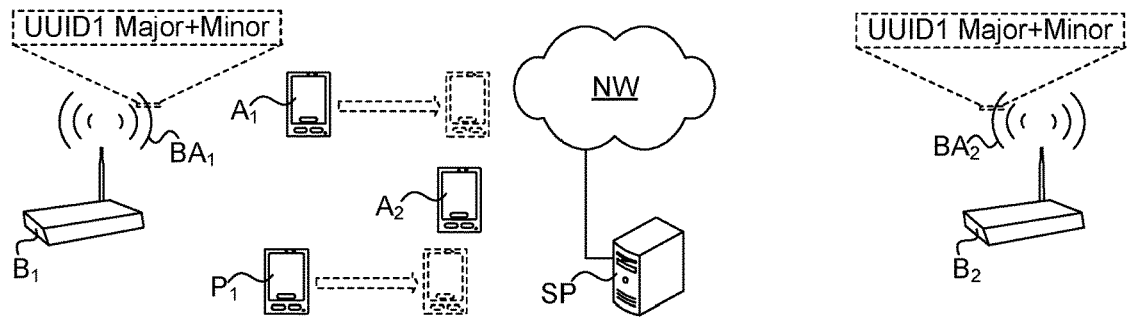
FIG. 1A illustrates a basic short-range wireless beacon system having at least one static-location beacon device and a plurality of mobile devices acting as beacon receivers.
Figure 1B:
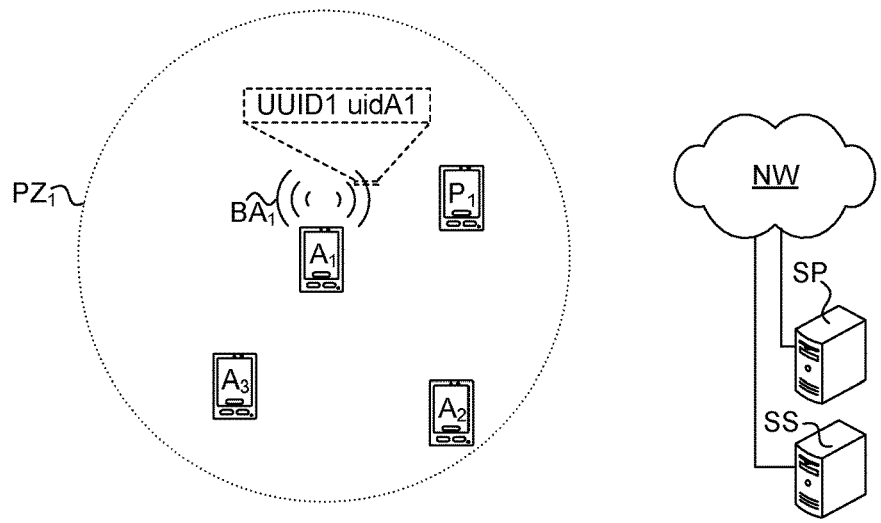
FIGS. 1B-1C illustrates an alternative short-range wireless beacon system having a plurality of mobile devices acting as beacon transmitters as well as beacon receivers.
Figure 1C:
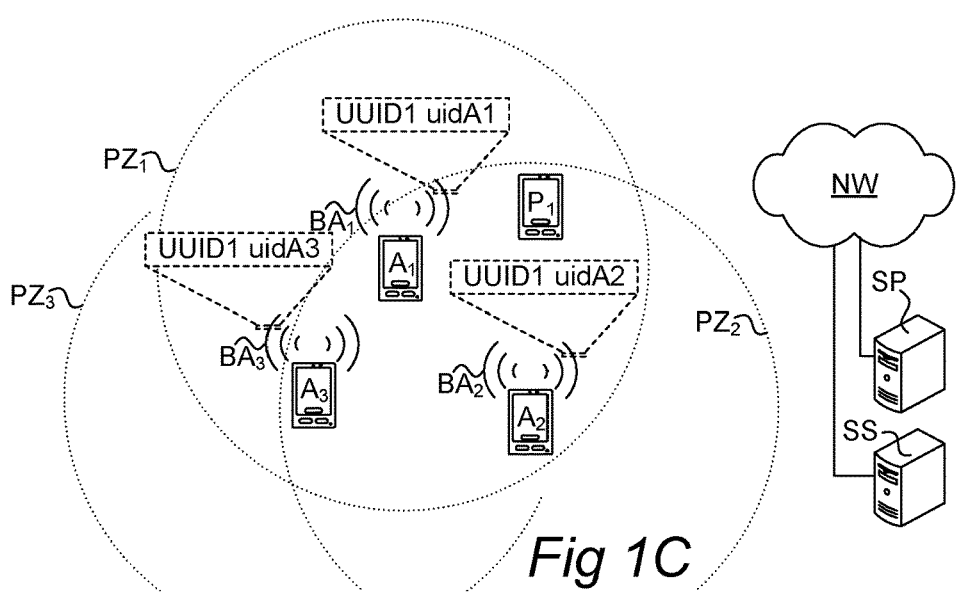
Figure 2:
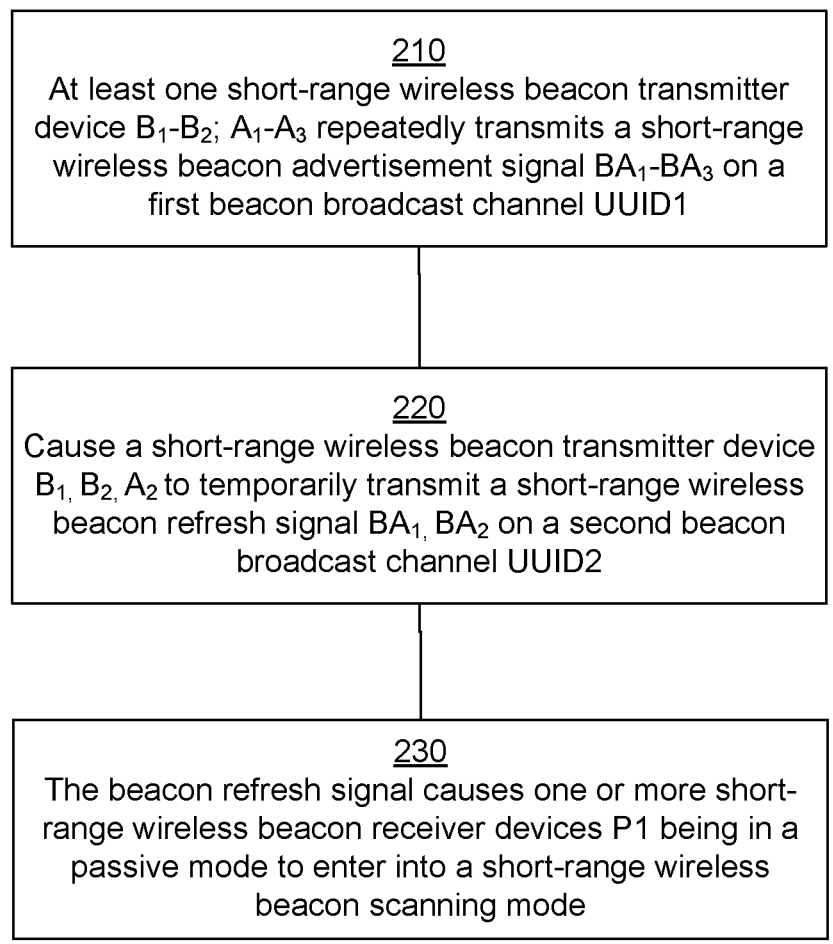
FIG. 2 illustrates a general method according to the invention of operating a short-range wireless beacon communication system with improved ability to detect passive beacon receiver devices.

FIG. 2 illustrates a general method 200 of operating a short-range wireless beacon communication system with improved ability to detect passive beacon receiver devices. The method may be applied, for instance, in the short-range wireless beacon communication system shown in FIG. 1A, or in the short-range wireless beacon communication system shown in FIGS. 1B-1C.

In a first step 210, at least one short-range wireless beacon transmitter device repeatedly transmits a short-range wireless beacon advertisement signal on a first beacon broadcast channel. This represents the normal modus operandi of any typical short-range wireless beacon communication system. In FIG. 1A, step 210 may correspond to the beacon device $B_1$ repeatedly transmitting its short-range wireless beacon advertisement signal $BA_1$ on the first beacon broadcast channel UUID1. Similarly, in FIG. 1B, step 210 may correspond to the first active mobile device $A_1$ repeatedly transmitting its short-range wireless beacon advertisement signal $BA_1$ on the first beacon broadcast channel UUID1.

As explained above, the transmission of the short-range wireless beacon advertisement signal $BA_1$ on the first beacon broadcast channel UUID1 will cause reactions from other active mobile devices $A_1$-$A_2$ (FIG. 1A)/$A_2$-$A_3$ (FIG. 1B) in the proximity zone $PZ_1$. The transmission on the first beacon broadcast channel UUID1 may also be detected by one or more passive mobile devices $P_1$ in the proximity zone $PZ_1$. However, as explained above in the Background section, each passive mobile device P1 will then not be susceptive of, i.e. reactive to, additional transmissions on the first beacon broadcast channel UUID1 as long as it remains within reach of the sending beacon device $B_1$/first active mobile device $A_1$. The subsequent step 220 of the general inventive method addresses this situation.

In step 220, a short-range wireless beacon transmitter device in the beacon system is caused to temporarily transmit a short-range wireless beacon refresh signal on a second beacon broadcast channel. As seen in step 230, the beacon refresh signal will cause one or more short-range wireless beacon receiver devices being in a passive mode, e.g. the aforementioned passive mobile device $P_1$, to enter into a short-range wireless beacon scanning mode. This will in effect serve as a poke signal to awake the passive mobile device from its deafened condition, and hence again allow it to receive wireless beacon advertisement signals on the first beacon broadcast channel during the beacon scanning mode and potentially switch to active mode.

Figure 3A:
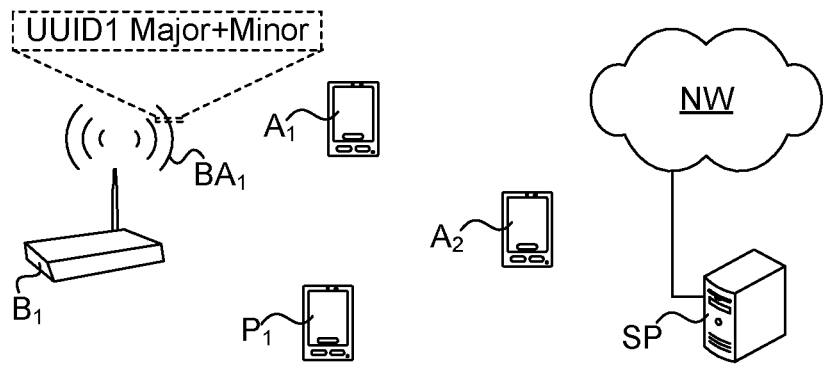
FIGS. 3A-3C are illustrations of a chain of events occurring in a beacon system generally designed according to one embodiment of the system in FIG. 1A when being subjected to the operating method of FIG. 2.
Figure 3B:
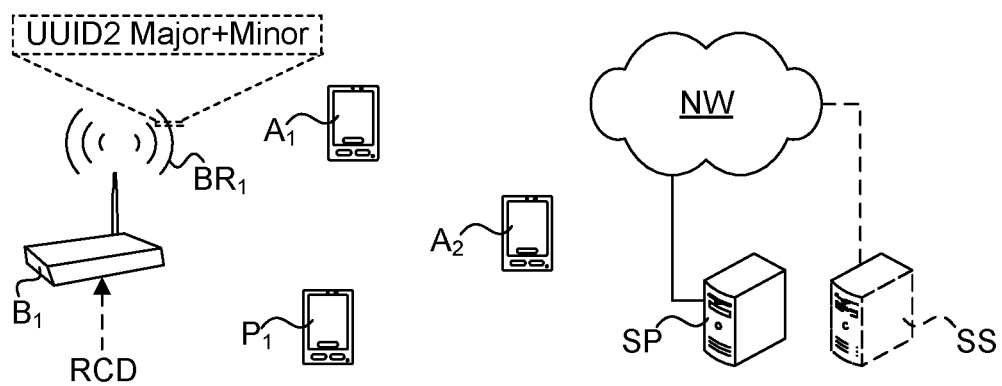
Figure 3C:
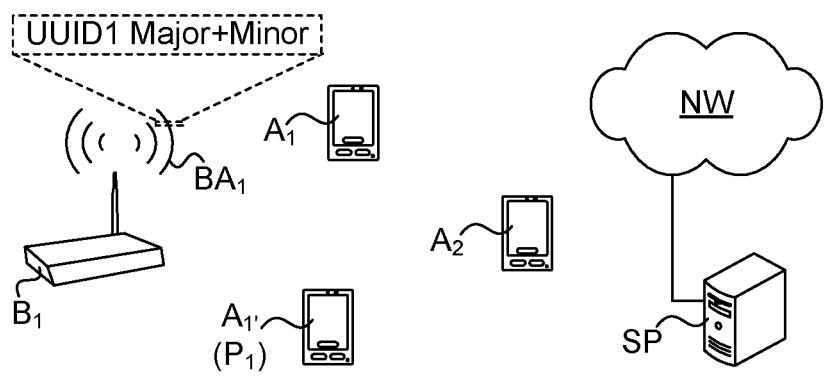

FIGS. 3A-3C illustrate what happens to one embodiment of the beacon system in FIG. 1A when subjected to the operating method of FIG. 2. In this embodiment, the beacon system only has a single, static-location beacon device $B_1$. The situation in step 210 is represented by FIG. 3A; the beacon device $B_1$ repeatedly transmits its short-range wireless beacon advertisement signal $BA_1$ on the first beacon broadcast channel UUID1. Active mobile devices $A_1$-$A_2$ may receive and react upon the beacon advertisement signal $BA_1$ as previously discussed. Passive mobile device $P_1$ may detect the transmission of the short-range wireless beacon advertisement signal $BA_1$ on the first beacon broadcast channel UUID1, but unless it switches to active mode, it will be temporarily deafened out from reacting on further transmissions on the first beacon broadcast channel UUID1.

The situation in step 220 is represented by FIG. 3B. Here, the beacon device $B_1$ temporarily suspends transmission on the first beacon broadcast channel UUID1 and instead switches to transmit a short-range wireless beacon refresh signal $BR_1$ on a second beacon broadcast channel UUID2, where UUID2 is different from UUID1.

The situation in step 230 is represented by FIG. 3C. The beacon refresh signal $BR_1$ from step 220 will have awakened the passive mobile device $P_1$ from its deafened condition and caused it to enter into the short-range wireless beacon scanning mode. Meanwhile, the beacon device $B_1$ has resumed its ordinary transmission of the wireless beacon advertisement signal $BA_1$ on the first beacon broadcast channel UUID1. Hence, since it has now been caused into the beacon scanning mode, the passive mobile device $P_1$ will again be able to receive the wireless beacon advertisement signal $BA_1$ on the first beacon broadcast channel UUID1, and potentially switch to active mode from the beacon scanning mode. This is illustrated in FIG. 3C as the former passive mobile device $P_1$ now being an active mobile device $A_{1'}$.

Figure 4A:
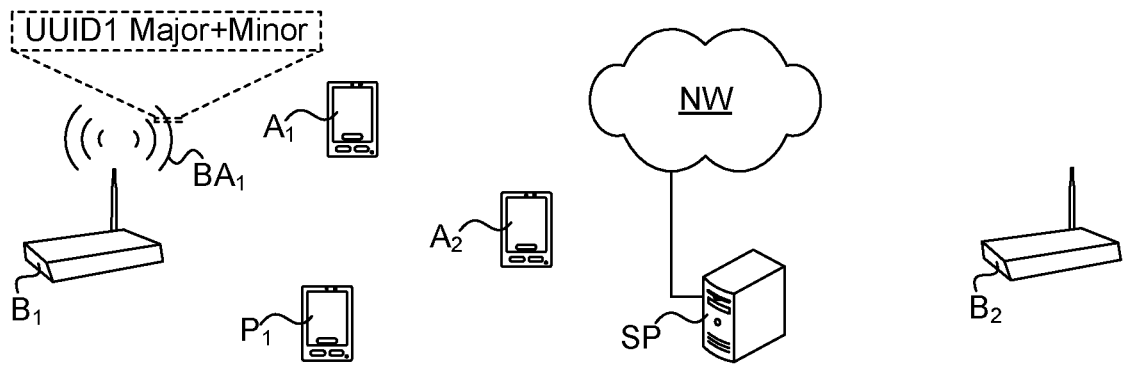
FIGS. 4A-4C are illustrations of a chain of events occurring in a beacon system generally designed according to another embodiment of the system in FIG. 1A when being subjected to the operating method of FIG. 2.
Figure 4B:
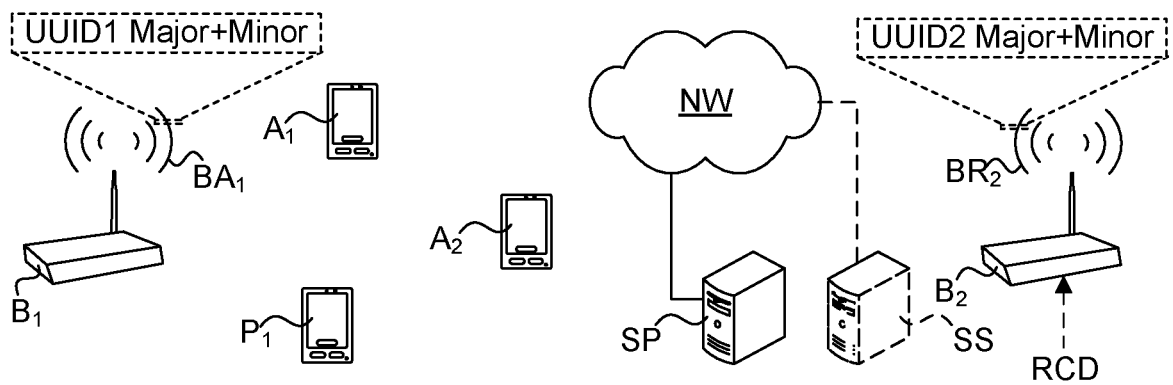
Figure 4C:
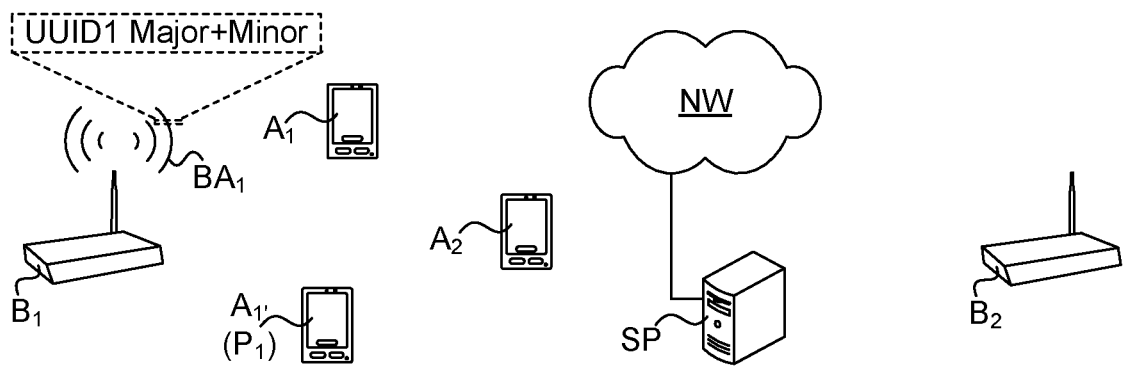

FIGS. 4A-4C illustrate what happens to another embodiment of the beacon system in FIG. 1A when subjected to the operating method of FIG. 2. In this embodiment, the beacon system still has the static-location beacon device $B_1$ which repeatedly transmits its short-range wireless beacon advertisement signal $BA_1$ on the first beacon broadcast channel UUID1, see FIG. 4A and step 210 in FIG. 2. Active mobile devices $A_1$-$A_2$ may receive and react upon the beacon advertisement signal $BA_1$ as previously discussed. Passive mobile device $P_1$ may detect the transmission of the short-range wireless beacon advertisement signal $BA_1$ on the first beacon broadcast channel UUID1, but again, unless it switches to active mode, it will be temporarily deafened out from reacting on further transmissions on the first beacon broadcast channel UUID1.

The situation in step 220 is represented by FIG. 4B. Unlike in the previous embodiment (FIG. 3B), the beacon device $B_1$ in FIG. 4B continues to transmit its short-range wireless beacon advertisement signal $BA_1$ on the first beacon broadcast channel UUID1. Instead, a separate beacon device $B_2$ is provided to temporarily transmit a short-range wireless beacon refresh signal $BR_2$ on a second beacon broadcast channel UUID2, where UUID2 again is different from UUID1. The separate beacon device $B_2$ may be a static-location beacon device, like the ordinary beacon device $B_1$, or it may be a mobile device, like any of the mobile devices $A_1$-$A_2$ when being enabled to act as short-range wireless beacon transmitter devices as well as short-range wireless beacon receiver devices (i.e., like the active mobile devices $A_1$-$A_3$ referred to in conjunction with FIGS. 1B-1C above).

The transmission of the wireless beacon refresh signal $BR_2$ on the second beacon broadcast channel UUID2 by the separate beacon device $B_2$ will cause awakening of the passive mobile device $P_1$, as previously discussed, even when the transmission of the short-range wireless beacon advertisement signal $BA_1$ by the ordinary beacon device $B_1$ continues uninterrupted on the first beacon broadcast channel UUID1. Hence, since it has now been caused into the beacon scanning mode, the passive mobile device $P_1$ will again be able to receive the wireless beacon advertisement signal $BA_1$ on the first beacon broadcast channel UUID1, and potentially switch to active mode from the beacon scanning mode. Similarly to FIG. 3C, this is illustrated in FIG. 4C as the former passive mobile device $P_1$ now being an active mobile device $A_{1'}$.

One additional advantage of applying the present invention particularly to a beacon system like the ones shown in FIG. 1A, i.e. where several static beacon devices are sending beacon advertisement signals on the same beacon broadcast channel, is that it will be easier for the host of the beacon devices, or the designer of the beacon system, to put the beacon devices closer to each other. By repeatedly awakening passive mobile devices in the beacon system, the chances of them reacting to different beacon devices while moving are increased.

Figure 5A:
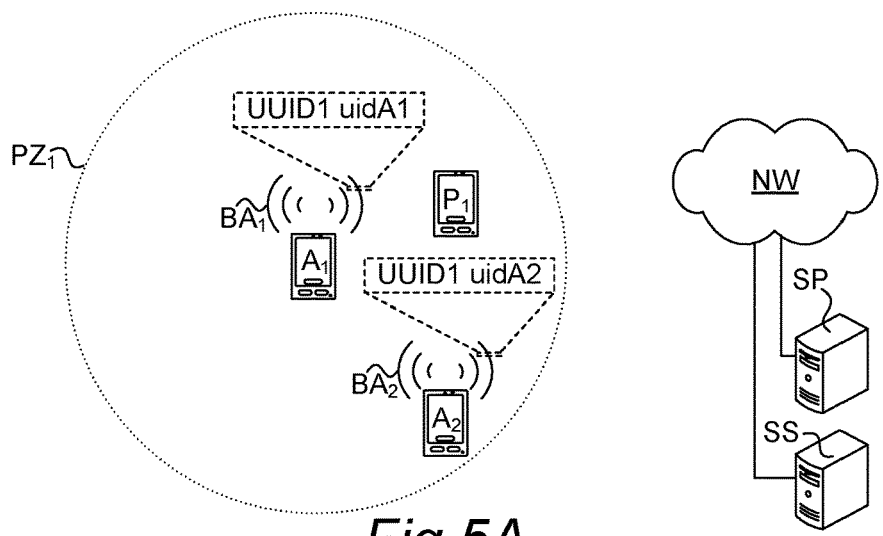
FIGS. 5A-5C are illustrations of a chain of events occurring in a beacon system generally designed according to an embodiment of the system in FIGS. 1B-1C when being subjected to the operating method of FIG. 2.
Figure 5B:
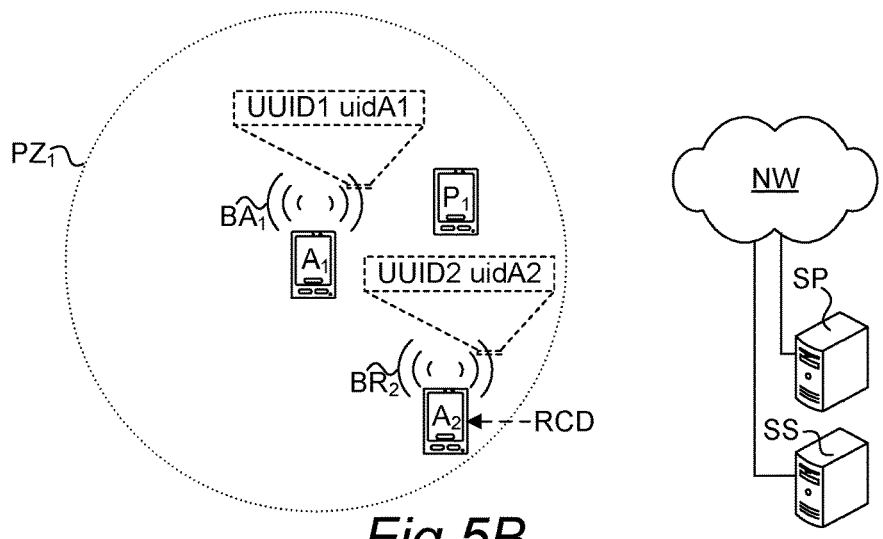
Figure 5C:
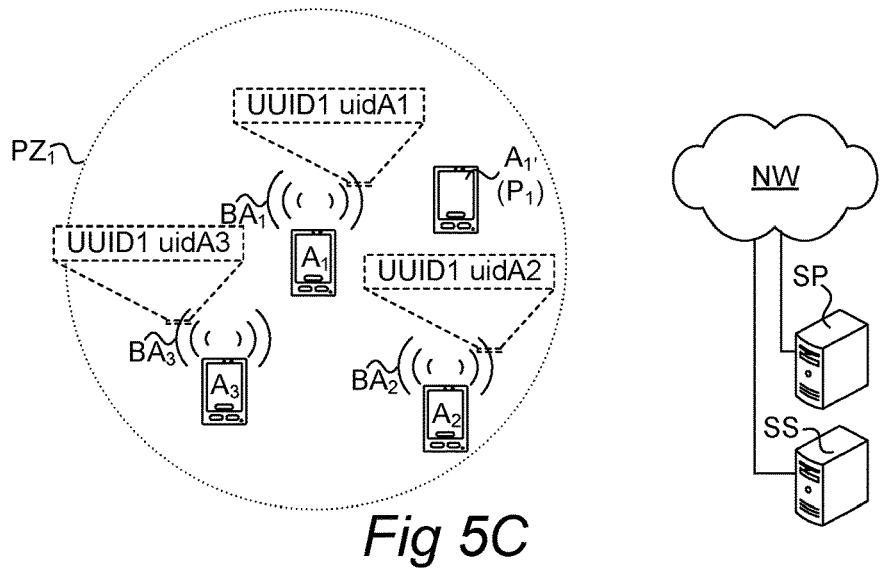

FIGS. 5A-5C illustrate what happens to an embodiment of the beacon system in FIGS. 1B-1C when subjected to the operating method of FIG. 2. In this embodiment, the beacon system is based on mobile devices which are capable of acting both as short-range wireless beacon receiver devices and, when in active mode, as short-range wireless beacon transmitter devices. As has already been explained, the system in FIGS. 1B-1C is preferably used for implementing the above-mentioned bubble concept.

The situation in step 210 of FIG. 2 is represented by FIG. 5A. One or more of the active mobile devices repeatedly transmit a short-range wireless beacon advertisement signal on the first beacon broadcast channel UUID1. More specifically, in the situation in FIG. 5A, first and second active mobile devices $A_1$-$A_2$ both repeatedly broadcasts its respective short-range wireless beacon advertisement signals $BA_1$ and $BA_2$, both containing the 128-bit universally unique identifier UUID1 as the beacon broadcast channel indicator. The beacon advertisement signals $BA_1$ and $BA_2$ are individualized by the device identifiers uidA1 and uidA2, respectively, as previously discussed.

Active mobile devices nearby, including the active mobile devices $A_1$ and $A_2$ as well as other active mobile devices within the respective proximity zone, may receive and react upon the respective beacon advertisement signal $BA_1$ and $BA_2$, as previously discussed. Passive mobile device $P_1$ may detect the transmission of the short-range wireless beacon advertisement signal $BA_1$ or $BA_2$ on the first beacon broadcast channel UUID1, but unless it switches to active mode, it will be temporarily deafened out from reacting on further transmissions on the first beacon broadcast channel UUID1.

The situation in step 220 of FIG. 2 is represented by FIG. 5B. Here, one of the active mobile devices $A_1$ and $A_2$ temporarily suspends transmission on the first beacon broadcast channel UUID1 and instead switches to transmit a short-range wireless beacon refresh signal $BR_2$ on a second beacon broadcast channel UUID2, where UUID2 is different from UUID1. More specifically, in FIG. 5B, the second active mobile device $A_2$ is the one that temporarily switches to transmission of the beacon refresh signal $BR_2$ on the second beacon broadcast channel UUID2.

The situation in step 230 is represented by FIG. 5C. The beacon refresh signal $BR_2$ from the second active mobile device $A_2$ in step 220 will have awakened the passive mobile device $P_1$ from its deafened condition and caused it to enter into the short-range wireless beacon scanning mode. Meanwhile, the second active mobile device $A_2$ may have resumed its ordinary transmission of the wireless beacon advertisement signal $BA_2$ on the first beacon broadcast channel UUID1. Hence, both the first and the second active mobile devices $A_1$ and $A_2$ are again transmitting their wireless beacon advertisement signals $BA_1$ and $BA_2$ on the first beacon broadcast channel UUID1. Moreover, additional active mobile devices, such as a third active mobile device $A_3$ as seen in FIG. 5C, may have appeared to transmit its or their wireless beacon advertisement signal(s) $BA_3$ on the first beacon broadcast channel UUID1.

As a result, since it has now been caused into the beacon scanning mode by the beacon refresh signal $BR_2$ from the second active mobile device $A_2$ in step 220, the passive mobile device $P_1$ will in step 230 again be able to receive any of the wireless beacon advertisement signals $BA_1$-$BA_3$ on the first beacon broadcast channel UUID1, and potentially switch to active mode from the beacon scanning mode. This is illustrated in FIG. 5C as the former passive mobile device $P_1$ now being an active mobile device $A_{1'}$.

In an alternative embodiment, the temporary transmission of the short-range wireless beacon refresh signal on the second beacon broadcast channel UUID2 is made by a separate beacon device (like beacon device $B_2$ in FIG. 4B), wherein all of the active mobile devices $A_1$-$A_3$ may transmit only beacon advertisement signals and solely on the first beacon broadcast channel UUID1.

The beacon refresh signal transmitting device $B_1$; $B_2$; $A_2$ may be configured to transmit the short-range wireless beacon refresh signal $BR_1$; $BR_2$ on the second beacon broadcast channel UUID2 at a defined occasion.

Such a defined occasion may for instance be the occurrence of a predefined time value being monitored by the beacon refresh signal transmitting device $B_1$; $B_2$; $A_2$. Hence, in the exemplifying situations in FIGS. 3A-3C, 4A-4C and 5A-5C, the ordinary static-location beacon device $B_1$, the separate beacon device $B_2$ or the active mobile device $A_2$ may be configured to determine when a current value from an internal or external clock device matches the predefined time value. The predefined time value may be cyclic in the sense that it states a time value in seconds and/or minutes (and/or possibly hours), which thus occurs repeatedly throughout the course of a day.

Alternatively, a defined occasion may for instance be the expiration of a predefined timer value being monitored by the beacon refresh signal transmitting device $B_1$; $B_2$; $A_2$. Hence, in the exemplifying situations in FIGS. 3A-3C, 4A-4C and 5A-5C, the ordinary static-location beacon device $B_1$, the separate beacon device $B_2$ or the active mobile device $A_2$ may be configured to set an internal or external timer device and determine when it expires.

The predefined time value or timer value may have been provided to the beacon refresh signal transmitting device $B_1$; $B_2$; $A_2$ upon manufacture of the device, upon installation of certain software therein (such as the aforementioned bubble app), or by subsequent configuration by the user of the device.

In turn, the predefined time value or timer value may be stated in or derived from information contained in refresh control data RCD sent by a server in the form of a system server SS, service provider SP or any other external device to the beacon refresh signal transmitting device $B_1$; $B_2$; $A_2$. Reception of such refresh control data RCD is schematically indicated in FIGS. 3B, 4B and 5B.

Alternatively, such refresh control data from the system server SS, service provider SP or another external device to the beacon refresh signal transmitting device $B_1$; $B_2$; $A_2$ may contain a refresh command. Reception of the refresh command will then trigger the beacon refresh signal transmitting device $B_1$; $B_2$; $A_2$ to enter step 220 in FIG. 2, i.e. to transmit the short-range wireless beacon refresh signal $BR_1$; $BR_2$ on the second beacon broadcast channel UUID2.

Figure 10A:
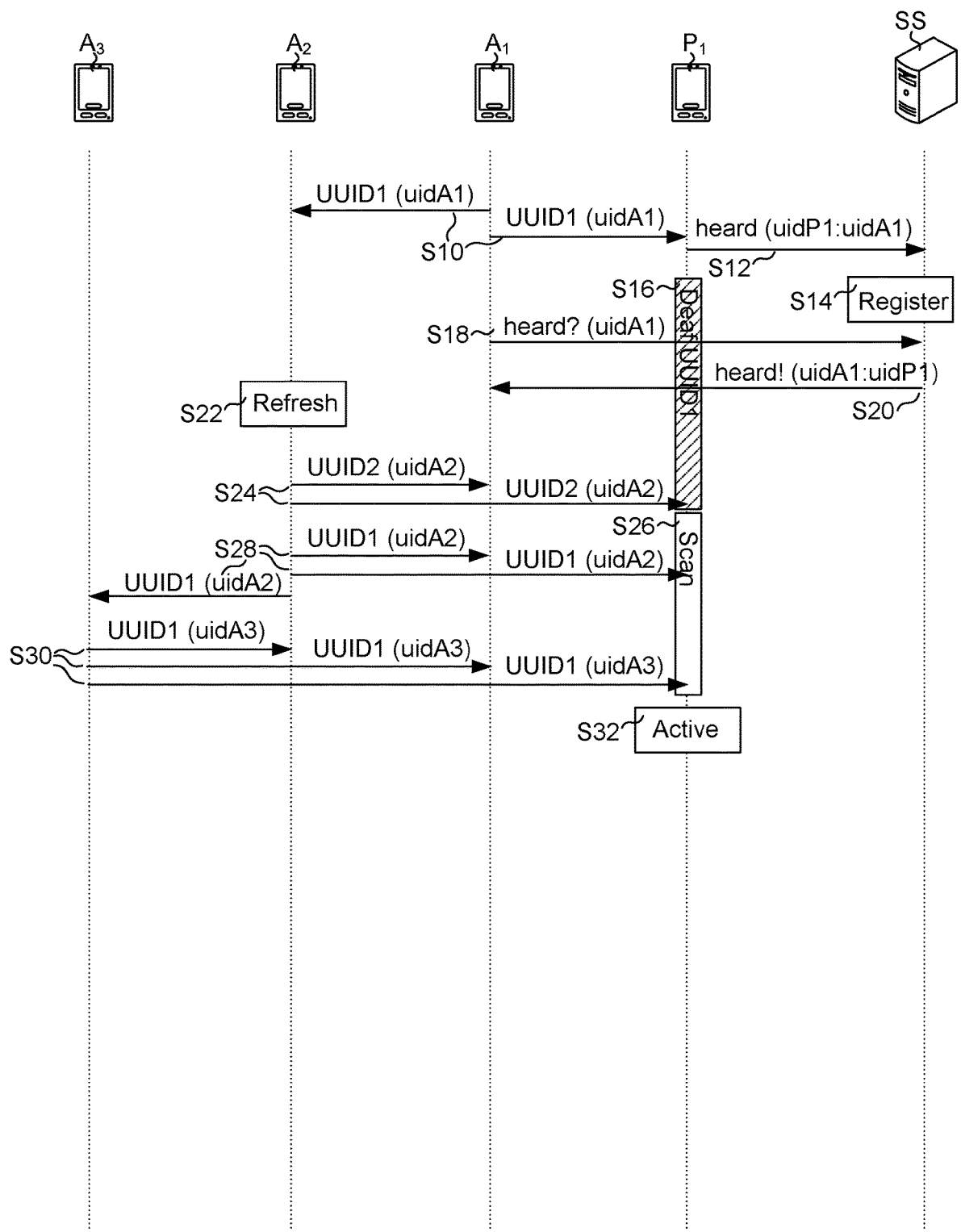
FIGS. 10A and 10B are schematic timeline charts illustrating exemplifying operation of the beacon system in FIGS. 5A-5C.
Figure 10B:
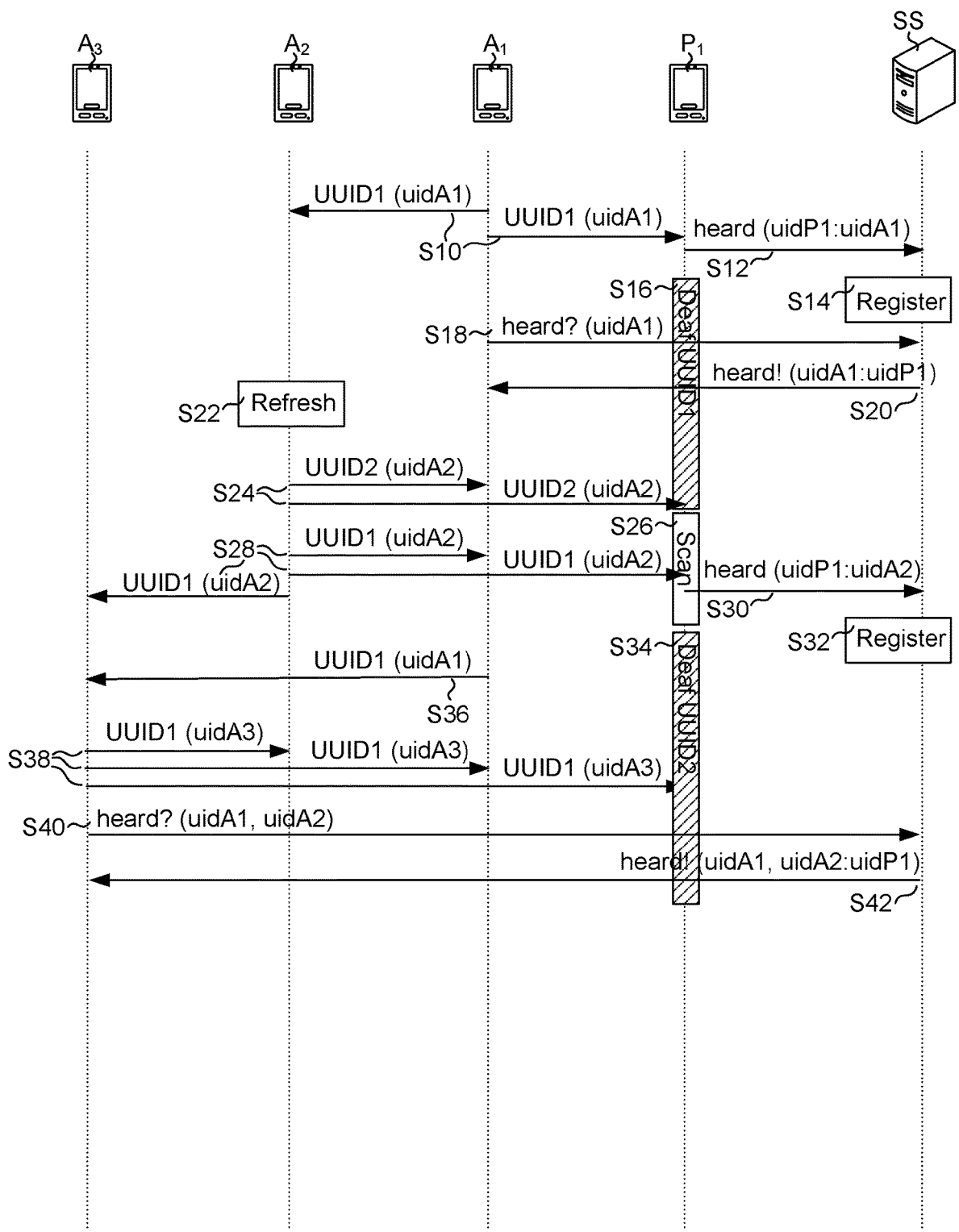

More advanced criteria for generating the beacon refresh signal may apply, particularly for embodiments which are based on a beacon system like the ones shown in FIGS. 1B-C and 5A-C, i.e. where several mobile devices may act both as short-range wireless beacon receiver devices and as short-range wireless beacon transmitter devices. This aspect will be returned to later on in this document. Reference is first made to FIGS. 10A and 10B, which illustrate two different exemplifying timeline charts for the embodiment shown in FIGS. 5A-C.

In FIG. 10A, the first active mobile device $A_1$ broadcasts its short-range wireless beacon advertisement signal $BA_1$ on the first beacon broadcast channel UUID1 in step S10. It is received by the second active mobile device $A_2$ (that may have broadcasted its own wireless beacon advertisement signal $BA_2$ prior to this; not shown in FIG. 10A but seen in FIG. 5A).

The short-range wireless beacon advertisement signal $BA_1$ from the first active mobile device $A_1$ is also received by the passive mobile device $P_1$. In response, the passive mobile device $P_1$ registers this by transmitting in step S12 a report to the system server SS over the communication network NW. In step S14, the system server SS registers that active mobile device $A_1$ has been heard by passive mobile device $P_1$.

As seen at S16, even though having heard the beacon advertisement signal $BA_1$ from the first active mobile device $A_1$, the passive mobile device $P_1$ decides not to enter active mode but remains in passive mode. As a result, the passive mobile device $P_1$ will be deafened out from reacting to any further transmissions on the first beacon broadcast channel UUID1, as previously discussed.

Nevertheless, as seen at S18 and thanks to the prior registration by the system server SS in step S14, the first active mobile device $A_1$ may enquire the system server SS about which passive mobile devices that have heard its the beacon advertisement signal $BA_1$. In response, the system server SS will inform the enquiring first active mobile device $A_1$ in step S20 about the fact that the passive mobile device $P_1$ has reported that it has heard the first active mobile device $A_1$.

In step S22, the second active mobile device $A_2$ determines that it is appropriate to send a beacon refresh signal $BR_2$ instead of the normal beacon advertisement signal $BA_2$. In one embodiment, this determination is made based on the fact that the second active mobile device $A_2$ detected the first active mobile device's $A_1$ transmission of the beacon advertisement signal $BA_1$ in step S10. Since this broadcast was made on the same channel UUID1 as the second active mobile device's $A_2$ uses for its own broadcast of the advertisement signal $BA_2$, the second active mobile device $A_2$ can conclude that there is a risk for passive device(s) nearby having been deafened out by the other transmitter (device $A_1$) on the common beacon broadcast channel UUID1.

In another embodiment, the determination about the need for refresh in step S22 is made based on that no passive mobile devices have reported hearing of the beacon advertisement signal $BA_2$ (cf steps S12-S14 for the beacon advertisement signal $BA_1$ of the first active mobile device $A_1$). The second active mobile device $A_2$ may determine this fact by sending an enquiry to the system server SS, corresponding to the enquiry made by the first active mobile device $A_1$ in step S18 as described above.

The second active mobile device $A_2$ executes the refresh in step S24 by transmitting the beacon refresh signal $BR_2$ on the second beacon broadcast channel UUID2. When the passive mobile device $P_1$ detects the beacon refresh signal $BR_2$ on the second beacon broadcast channel UUID2, it will enter into the beacon scanning mode, as seen at S26 and as previously discussed.

The passive mobile device $P_1$ will thus be able to hear and react on further transmissions on the first beacon broadcast channel UUID1 during the beacon scanning mode, in the form of beacon advertisement signals $BA_1$-$BA_3$ from the active mobile devices $A_1$-$A_3$ currently in the beacon system, see steps S28 and S30.

As a result, the passive mobile device $P_1$ may decide to enter active mode in step S32 and thus enjoy the full functionality (e.g. bubble services) provided in the beacon system.

The timeline chart in FIG. 10B differs from the above in that in this latter example, the passive device $P_1$ does not decide to enter active mode after having been awakened by the refresh signal. Still, valuable functionality is provided to participants of the beacon system, as will now be described.

The functionality up to and including step S28 is identical between FIGS. 10A and 10B.

In FIG. 10B, even though the passive mobile device $P_1$ does not decide to enter active mode, it is still in the beacon scanning mode (S26) when receiving the beacon advertisement signal $BA_2$ of the second active mobile device $A_2$, as sent in step S28. As a result, the passive mobile device $P_1$ will report to the system server SS in step S30 that it heard the second active mobile device $A_2$, and the system server SS will register this in step S32.

The passive mobile device $P_1$ exits the beacon scanning mode and resumes passive mode in step S34. As a result, it will not be able to react on the beacon advertisement signal $BA_3$ from the third mobile device $A_3$, as subsequently sent in step S38. From the point of view of the third active mobile device $A_3$, the passive mobile device $P_1$ would seem to be invisible. However, the third active mobile device $A_3$ has previously received the beacon advertisement signal $BA_1$ from the first active mobile device $A_1$, step S36, as well as the beacon advertisement signal $BA_2$ from the second active mobile device $A_2$, step S28. The third active mobile device $A_3$ may use this knowledge to enquire the system server in step S40 about what passive mobile devices that have reported in as a result of hearing the beacon advertisement signal from one or all of the other active mobile devices $A_1$, $A_2$ in the beacon system.

The system server SS will respond to the enquiry in step S42, wherein the third active mobile device $A_3$ will discover that the passive mobile device $P_1$ is indeed present in the beacon system, even though not having reported hearing the third active mobile device $A_3$ itself. Hence, the third active mobile device $A_3$ will be given an approximation of the current bubble when it comes to passive mobile devices currently present therein.

It is to be noticed that the functionality described above, i.e. for providing an active mobile device (e.g. $A_3$) with an approximation of the current bubble when it comes to passive mobile devices currently present therein, may very well be used in a beacon communication system in which short-range wireless beacon refresh signals on a second beacon broadcast channel are not used or do not exist. In other words, the functionality described above for providing an approximation of the current bubble may be used in beacon communication systems of the conventional type which use beacon advertisement signals only.

In one embodiment, the enquiry in step S40 will be made only for the one among the other active mobile devices $A_1$, $A_2$ which according to relative location information available to the enquiring third active mobile device $A_3$ can be assumed to be closest to the third active mobile device $A_3$. The rationale for this is that the closest other active mobile device can be expected to have the highest likelihood of having detected passive mobile devices which are relevant to (i.e. nearby) the enquiring third active mobile device $A_3$. In one embodiment, db range information included in the beacon advertisement signals $BA_1$, $BA_2$ from the other active mobile devices $A_1$, $A_2$ is used as such relative location information.

Corresponding reporting by passive mobile devices to the system server about them having heard a beacon refresh signal from any of the active mobile devices on the second beacon broadcast channel UUID2 may be made, i.e. like in steps S12-S14 and S30-S32, but for the hearing of the beacon refresh signal instead of the beacon advertisement signal. Hence, enquiries corresponding to steps S18-S20 and S40-S42 may be made to the system server SS by any of the active mobile devices. Such enquiry responses may then include information about passive devices having heard an active mobile device on the first beacon broadcast channel UUID1, on the second beacon broadcast channel UUID2, or both.

Figure 11:
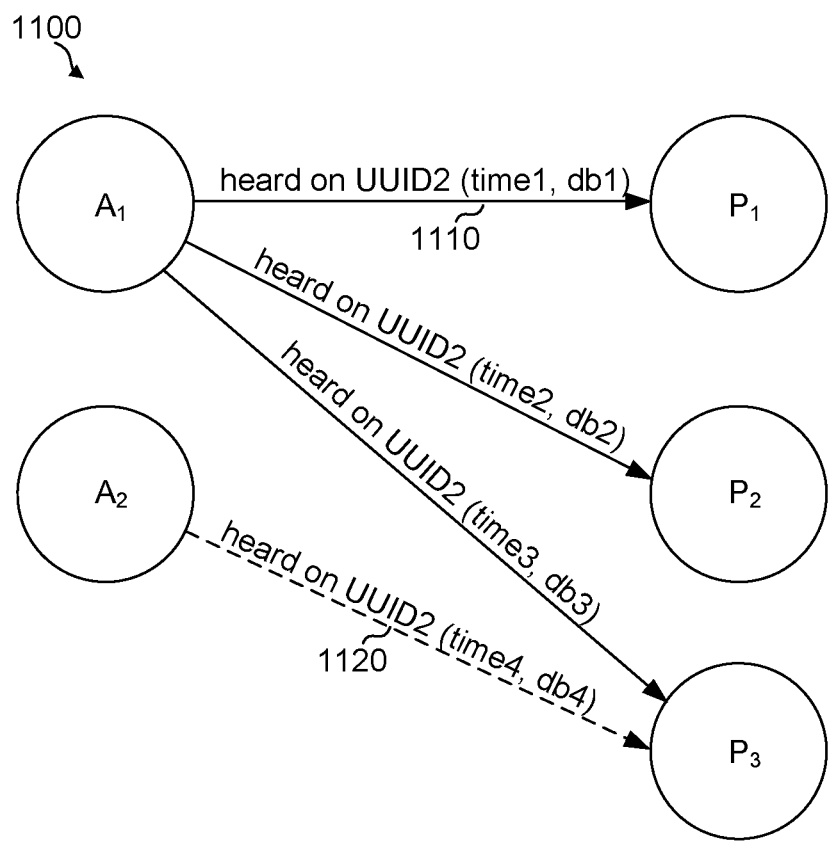
FIG. 11 is a graph diagram illustrating relation information managed by a system server about mobile devices in the beacon system in FIGS. 5A-5C.

Such registration by the system server SS of passive mobile devices having heard a beacon refresh signal from an active mobile device can be used for intelligent scheduling of when it is appropriate for a specific active mobile device to send a (new) beacon refresh signal (like in step S22). The functionality will now be described with reference to FIG. 11.

Each time a passive mobile device $P_1$, $P_2$, $P_3$ hears a beacon refresh signal $BR_1$, $BR_2$ from an active mobile devices $A_1$, $A_2$ on the second beacon broadcast channel UUID2, it reports this to the system server SS as previously described for step S12 or S30 in FIGS. 10A-B. The system server SS registers this like in step S14 or S32 by creating, in a data structure 1100, a relation e.g. in the form of a logical link 1110 between the passive mobile device, e.g. $P_1$, and the active mobile device, e.g. $A_1$, from which it heard the beacon refresh signal, e.g. $BR_1$. With the link 1110 the system server SS also registers a current time time1 and a signal strength value db1 as perceived by the reporting passive mobile device $P_1$.

When a passive mobile device $P_1$, $P_2$, $P_3$ no longer receives beacon refresh signals from an active mobile device on the second beacon broadcast channel UUID2, it again reports this to the system server SS by way of an unheard message similar to the heard report previously described for step S12 or S30 in FIGS. 10A-B. The system server SS will then remove the logical link between the active mobile device and passive mobile device. This is seen for the active mobile device $A_2$ and passive mobile device $P_3$ in FIG. 11, the logical link 1120 being removed is indicated by a dashed line.

Each active mobile device may enquire the system server SS for information pertaining to passive mobile devices being associated therewith on the second beacon broadcast channel UUID2 by sending an enquiry like in step S18 or S40 in FIGS. 10A-B. When the enquiring active mobile device, e.g. $A_2$, notices from the information in the enquiry response (like in S20 or S42 in FIGS. 10A-B) that there are currently no passive mobile devices associated with it (link 1120 in FIG. 11 having been removed) as regards the second beacon broadcast channel UUID2, or at least less than a threshold number of passive mobile devices associated with it, the enquiring active mobile device $A_2$ may determine that it is now appropriate to make a new refresh by sending the beacon refresh signal $BR_2$ on the second beacon broadcast channel UUID2.

Since the data structure 1100 contains time information time1, time2, time3, time4 about when the respective registration was made, the system server SS may detect when the time elapsed since registration exceeds a threshold value, and "manually" (i.e. without receiving a report from a passive mobile device) remove the logical link between the active mobile device and passive mobile device. This may be useful to prevent misalignment in the data structure 1100 due to failure by the passive mobile device to send the unheard report, or failure by the system server SS to receive and duly register the report.

Corresponding registrations and data structure 1100 may be made by the system server SS for passive mobile devices hearing the beacon advertisement signals from active mobile devices on the beacon advertisement channel UUID1.

Figure 6A:
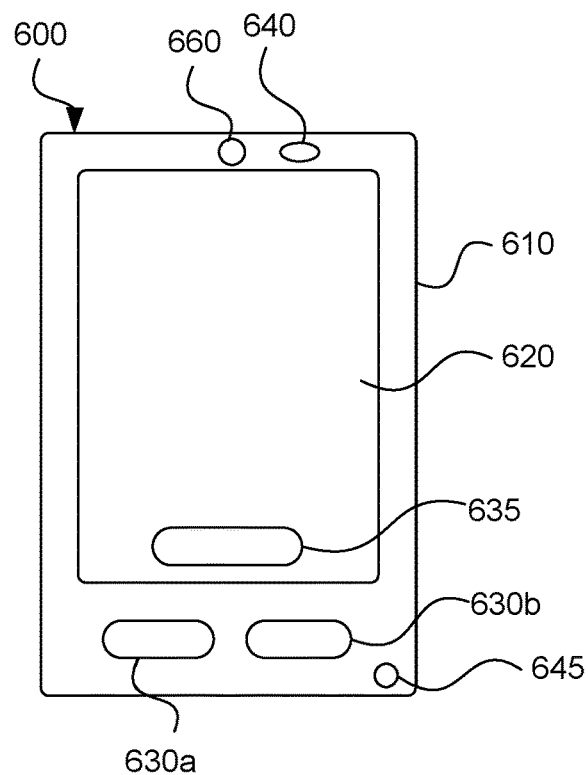
FIGS. 6A and 6B are schematic views of a mobile communication device according to two respective embodiments.
Figure 6B:
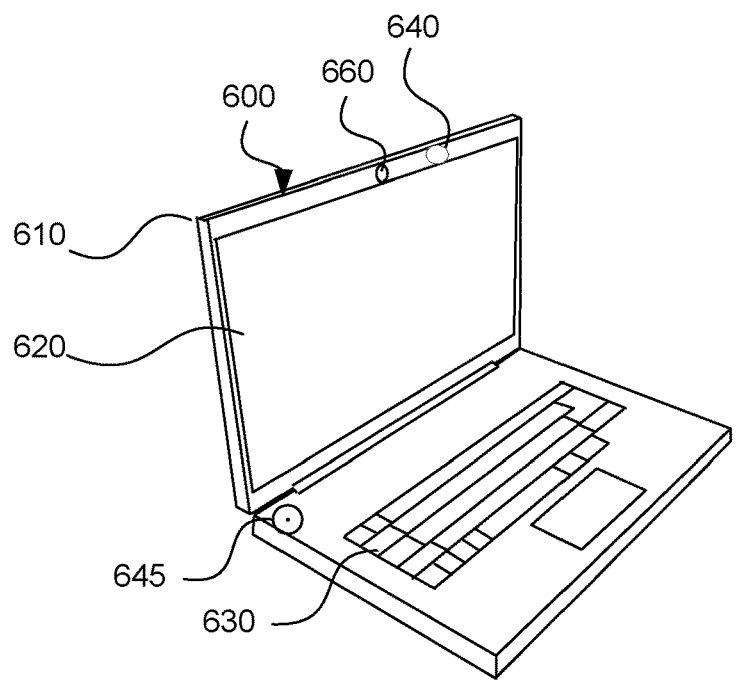

FIGS. 6A and 6B generally show a mobile, or wireless, communication device 600 which may implement any of the mobile devices $A_1$-$A_3$, $P_1$ referred to above. Referring to FIG. 6A, the wireless communication device is a mobile telecommunications terminal in the form of a smartphone or a tablet computer (arranged with a wireless communication interface), comprising a housing 610 in which a display 620 is arranged. In one embodiment the display 620 is a touch display. In other embodiments the display 620 is a non-touch display. Furthermore, the smartphone 600 comprises two keys 630a, 630b. In this embodiment there are two keys 630, but any number of keys is possible and depends on the design of the smartphone 600.

In one embodiment the smartphone 600 is configured to display and operate a virtual key 635 on the touch display 620. It should be noted that the number of virtual keys 635 depends on the design of the smartphone 600 and an application that is executed on the smartphone 600. The smartphone 600 may also be equipped with a camera 660. The camera 660 may be a digital camera that is arranged to take video or still photographs by recording images on an electronic image sensor (not shown). In one embodiment the camera 660 may be an external camera. In one embodiment the camera may alternatively be replaced by a source providing an image stream. The smartphone 600 may also be equipped with a loudspeaker 640 and a microphone 645.

Referring to FIG. 6B, a laptop computer 600 comprises a display 620 and a housing 610. The housing comprises a controller or CPU (not shown) and one or more computer-readable storage media (not shown), such as storage units and internal memory. Examples of storage units are disk drives or hard drives. The laptop computer 600 further comprises at least one data port. Data ports can be wired and/or wireless. Examples of data ports are USB (Universal Serial Bus) ports, Ethernet ports or WiFi (according to IEEE standard 802.11) ports. Data ports are configured to enable the laptop computer 600 to connect with other computing devices or a server.

The laptop computer 600 further comprises at least one input unit such as a keyboard 630. Other examples of input units are computer mice, touch pads, touch screens or joysticks, to name a few.

The laptop computer 600 may further be equipped with a camera 660. The camera 660 may be a digital camera that is arranged to take video or still photographs by recording images on an electronic image sensor (not shown). In one embodiment the camera 660 may be an external camera. In one embodiment the camera may alternatively be replaced by a source providing an image stream. The laptop computer 600 may also be equipped with a loudspeaker 640 and a microphone 645. The wireless communication device 600 according to FIG. 6A or FIG. 6B may be configured to detect and track an object, for instance a hand of a user, via the camera 660.

Figure 7:
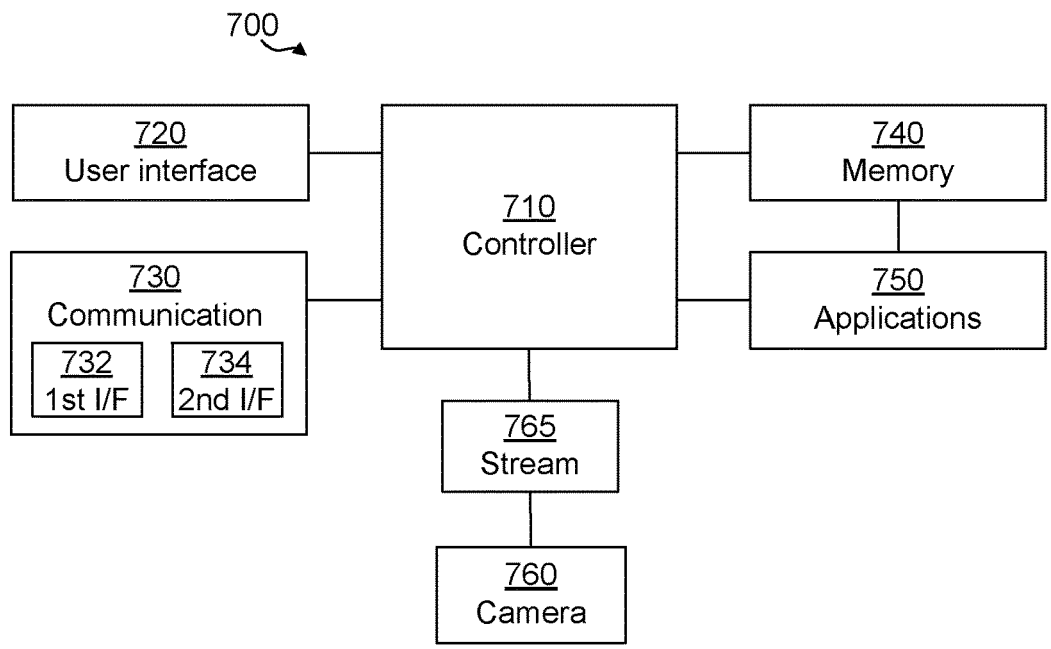
FIG. 7 is a schematic view of components of the mobile communication device in FIG. 6A or 6B.

FIG. 7 shows a schematic view of the general structure of a communication device according to FIG. 6A or FIG. 6B. The device 700 comprises a controller 710 which is responsible for the overall operation of the wireless communication device 700 and is preferably implemented by any commercially available CPU ("Central Processing Unit"), DSP ("Digital Signal Processor") or any other electronic programmable logic device. The controller 710 is configured to read instructions from a memory 740 and execute these instructions to control the operation of the wireless communication device 200. The memory 740 may be implemented using any commonly known technology for computer-readable memories such as ROM, RAM, SRAM, DRAM, CMOS, FLASH, DDR, SDRAM or some other memory technology. The memory 740 is used for various purposes by the controller 710, one of them being for storing application data and program instructions 750 for various software modules in the wireless communication device 700. The software modules may include a real-time operating system, drivers for a user interface 720, an application handler as well as various applications 750.

The wireless communication device 700 further comprises the user interface 720, which in the devices 700 of FIGS. 6A and 6B is comprised of the display 620 and the keys 630, 635. The user interface may also comprise the microphone 645 and the loudspeaker 644.

The wireless communication device 700 further comprises wireless communication means 730, which is adapted to allow the wireless communication device 700 to communicate with other devices through the use of different radio frequency technologies. More specifically, the wireless communication means 730 comprises a first communication interface 732 for short-range wireless beacon broadcast messaging. The first communication interface 732 may, advantageously, be implemented as an iBeacon and/or Bluetooth Low Energy (BLE)/Bluetooth 4.0 compliant communication interface.

Moreover, the wireless communication means 730 comprises a second communication interface 734 for communicating with a server like the system server SS and/or the service provider SP via the communication network NW. The communication with the server typically occurs at a substantially higher bandwidth than the short-range wireless beacon broadcast messaging. The server may be a stand-alone computing resource external to the wireless communication device 700, a cloud-based (distributed) computing resource, or, in alternative embodiments, implemented at least partly in and by the wireless communication device 700. The second communication interface 734 may, advantageously, be implemented as a communication interface compliant with IEEE 802.11, IEEE 802.15, ZigBee, WirelessHART, WiFi, Bluetooth®, WCDMA, HSPA, GSM, UTRAN, UMTS, and LTE, to name a few. It should be noted that, as is commonly known, the wireless communication means 730 may be arranged to communicate according to more than one technology and many different combinations may therefore be available; for example, a smartphone is commonly arranged to communicate according to the Bluetooth® standard, the WiFi standard and the LTE standard.

The wireless communication device 700 is further equipped with a camera 760. The camera 760 is a digital camera that is arranged to take video or still photographs by recording images on an electronic image sensor (not shown). The camera 760 is operably connected to the controller 710 to provide the controller with a video stream 765, i.e. the series of images captured, for further processing possibly for use in and/or according to one or several of the applications 750. In one embodiment the camera 760 is an external camera or source of an image stream.

Figure 9:
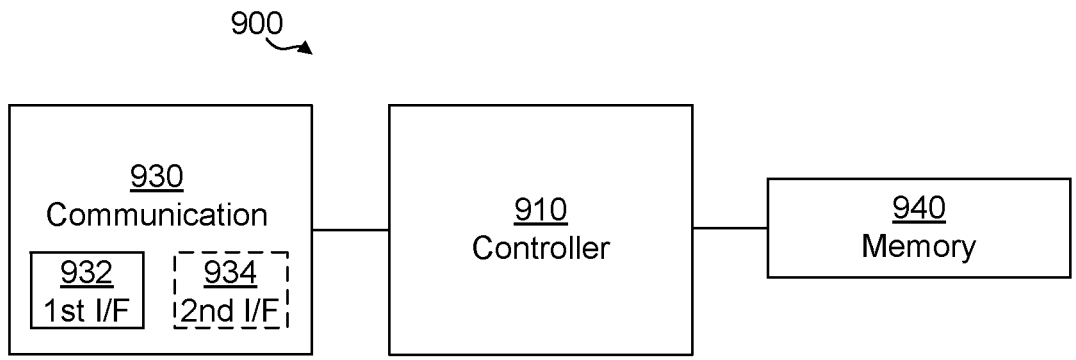
FIG. 9 is a schematic view of components of a beacon device.

FIG. 9 shows a schematic view of the general structure of a communication device 900 which may implement any of the beacon devices $B_1$ or $B_1$ as described herein. The device 900 comprises a controller 910 which is responsible for the overall operation of the wireless communication device 900 and is preferably implemented by any commercially available CPU ("Central Processing Unit"), DSP ("Digital Signal Processor") or any other electronic programmable logic device. The controller 910 is configured to read instructions from a memory 940 and execute these instructions to control the operation of the wireless communication device 900. The memory 940 may be implemented using any commonly known technology for computer-readable memories such as ROM, RAM, SRAM, DRAM, CMOS, FLASH, DDR, SDRAM or some other memory technology. The memory 940 is used for various purposes by the controller 910, one of them being for storing application data and program instructions 750 for software which defines the device's 900 operating as a beacon transmitting device.

The wireless communication device 900 further comprises wireless communication means 930, which is adapted to allow the wireless communication device 900 to communicate with other devices. More specifically, the wireless communication means 930 comprises at least a first communication interface 932 which supports short-range wireless beacon broadcast messaging and may, advantageously, be implemented as an iBeacon® and/or Bluetooth Low Energy (BLE)/Bluetooth 4.0 compliant communication interface.

The wireless communication means 930 may also comprise a second communication interface 934 for communicating with a server like the system server SS and/or the service provider SP via the communication network NW. The second communication interface 934 will receive the refresh control data RCD when applicable and may, advantageously, be implemented as a communication interface compliant with IEEE 802.11, IEEE 802.15, ZigBee, WirelessHART, WiFi, Bluetooth °, WCDMA, HSPA, GSM, UTRAN, UMTS, and LTE, to name a few.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

Figure 8:
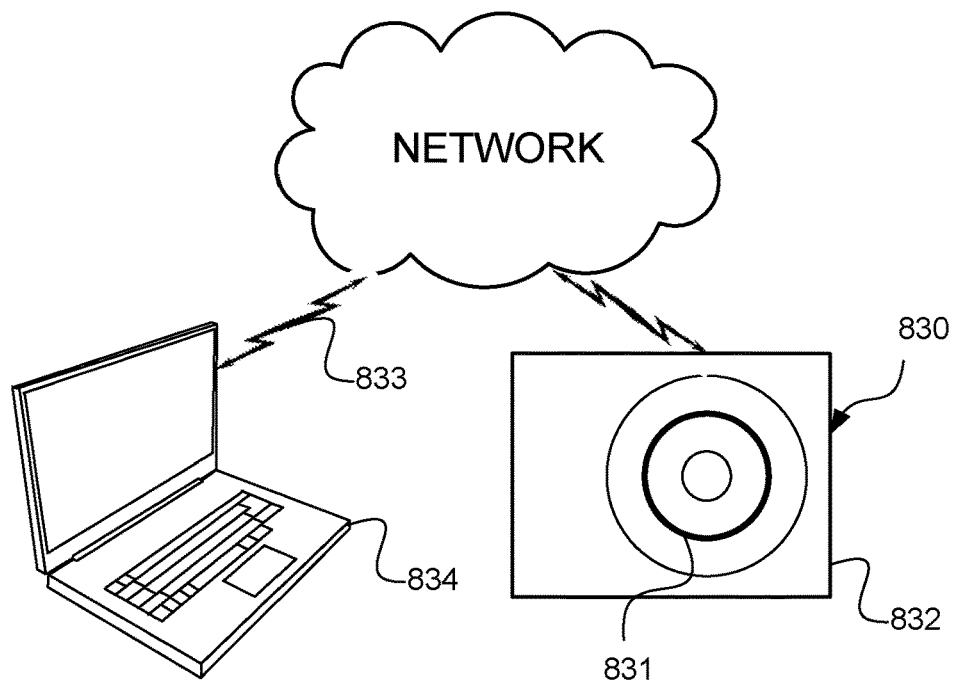
FIG. 8 is a schematic view of a computer-readable medium.

FIG. 8 shows a schematic view of a computer-readable medium as described in the above. The computer-readable medium 830 is in this embodiment a data disc 830. In one embodiment the data disc 830 is a magnetic data storage disc. The data disc 830 is configured to carry instructions 831 that when loaded into a controller, such as a processor, executes a method or procedure according to the embodiments disclosed above. The data disc 830 is arranged to be connected to or within and read by a reading device 832, for loading the instructions into the controller. One such example of a reading device 832 in combination with one (or several) data disc(s) 830 is a hard drive. It should be noted that the computer-readable medium can also be other media such as compact discs, digital video discs, flash memories or other memory technologies commonly used.

The instructions 831 may also be downloaded to a computer data reading device 834, such as a laptop computer or other device capable of reading computer coded data on a computer-readable medium, by comprising the instructions 831 in a computer-readable signal 833 which is transmitted via a wireless (or wired) interface (for example via the Internet) to the computer data reading device 834 for loading the instructions 831 into a controller. In such an embodiment the computer-readable signal 833 is one type of a computer-readable medium 830. The instructions may be stored in a memory (not shown explicitly in FIG. 8, but referenced as 740 in FIG. 8) of the computer data reading device 834.

References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

The various functionality described in this document may be performed in part or fully in a wireless communication device 700 or 900 comprising a controller as disclosed above with reference to FIGS. 6A, 6B, 7 and 9, and/or caused to be performed by executing instructions stored on a computer-readable medium as disclosed with reference to FIG. 8.

An additional advantage of applying the present invention to a beacon system is that it will facilitate use of db range check functionality. Typically, beacon transmitter devices send the beacon advertisement signal at full strength. It may be desired for beacon receiver devices to be able to react selectively depending on distance to the transmitter. However, for reasons explained previously in this document, there is a risk that passive mobile beacon receiver devices become deafened out already when first detecting the beacon transmitter device at a long distance, wherein they will be prevented from db range check selectivity. The present invention may serve to relieve this problem situation as well.

The location of applications programs, or apps, as referred to in this document with respect to a hierarchical software model is not critical; hence, they may be located at an application layer or alternatively at a lower layer, such as for instance being part of an operating system.

Even though the embodiments described above are based on beacon systems where a first beacon broadcast channel is represented by a first universally unique identifier and a second beacon broadcast channel is represented by a second universally unique identifier which is different from the first universally unique identifier, the invention may be applied also to other types of beacon systems. For instance, the invention may be applied to beacon system like AltBeacon, URIBeacon and Eddystone, which do not use a UUID but another form of identity (such as a tiny URL) in the 31-byte GAP BLE packet for the beacon advertisement signal.

As is apparent from the disclosure above, a first advantageous embodiment can be seen as a beacon communication system comprising:

one or more short-range wireless beacon transmitter devices ($B_1$-$B_2$; $A_1$-$A_3$); and a server (SS; SP), wherein a device ($B_1$-$B_2$; $A_1$-$A_3$) among the short-range wireless beacon transmitter devices is configured to repeatedly transmit a short-range wireless beacon advertisement signal ($BA_1$-$BA_3$) on a first beacon broadcast channel (UUID1), wherein a device ($B_1$; $B_2$; $A_2$) among the short-range wireless beacon transmitter devices ($B_1$-$B_2$; $A_1$-$A_3$) is configured to temporarily transmit a short-range wireless beacon refresh signal ($BR_1$; $BR_2$) on a second beacon broadcast channel (UUID2) at a defined occasion, the beacon refresh signal being adapted to cause one or more short-range wireless beacon receiver devices ($P_1$) being in a passive mode to enter into a short-range wireless beacon scanning mode, and wherein the defined occasion is determined (S22) by the beacon refresh signal transmitting device ($A_2$) as a result of having been informed by the server that no passive mobile devices have registered (S12-S14) hearing the short-range wireless beacon advertisement signal ($BA_2$) from the beacon refresh signal transmitting device ($A_2$).

The first advantageous embodiment also has a method aspect, as is apparent from the disclosure above.

The first advantageous embodiment also has a device aspect in the form of a communication device ($B_1$-$B_2$; $A_1$-$A_3$) comprising:
 a controller (810; 710); and
 a short-range wireless beacon transmitter (832; 732),
wherein the controller is configured to cause the beacon transmitter to perform the functions of at least said beacon refresh signal transmitting device ($B_1$; $B_2$; $A_2$) in said beacon communication system.

Moreover, a second advantageous embodiment can be seen as a beacon communication system comprising:
 one or more short-range wireless beacon transmitter devices ($B_1$-$B_2$; $A_1$-$A_3$); and
 a server (SS; SP),
 wherein a device ($B_1$-$B_2$; $A_1$-$A_3$) among the short-range wireless beacon transmitter devices is configured to repeatedly transmit a short-range wireless beacon advertisement signal ($BA_1$-$BA_3$) on a first beacon broadcast channel (UUID1),
 wherein a device ($B_1$; $B_2$; $A_2$) among the short-range wireless beacon transmitter devices ($B_1$-$B_2$; $A_1$-$A_3$) is configured to temporarily transmit a short-range wireless beacon refresh signal ($BR_1$; $BR_2$) on a second beacon broadcast channel (UUID2) at a defined occasion, the beacon refresh signal being adapted to cause one or more short-range wireless beacon receiver devices ($P_1$) being in a passive mode to enter into a short-range wireless beacon scanning mode, and
 wherein the server (SS) is configured for:
  receiving respective reports from beacon receiver devices ($P_1$-$P_3$) being in the passive mode when having detected respective beacon refresh signals ($BR_1$-$BR_3$) from the short-range wireless beacon transmitter devices ($A_1$-$A_3$) on the second beacon broadcast channel (UUID2);
  registering a relation (1110, 1120) between the reporting beacon receiver device ($P_1$, $P_3$) being in the passive mode and the beacon transmitter device ($A_1$, $A_2$) whose beacon refresh signal it detected;
  receiving an enquiry from one of the beacon transmitter devices ($A_2$); and
  responding to the enquiring beacon transmitter device ($A_2$) with information pertaining to registered relations between the enquiring beacon transmitter device ($A_2$) and beacon receiver devices ($P_1$) being in the passive mode, wherein the information serves to enable the enquiring beacon transmitter device ($A_2$) to determine whether a beacon refresh signal ($BR_2$) is to be sent.

The second advantageous embodiment also has a method aspect, as is apparent from the disclosure above.

The second advantageous embodiment also has a device aspect in the form of a communication device ($B_1$-$B_2$; $A_1$-$A_3$) comprising:
 a controller (810; 710); and
 a short-range wireless beacon transmitter (832; 732),
wherein the controller is configured to cause the beacon transmitter to perform the functions of at least said beacon refresh signal transmitting device ($B_1$; $B_2$; $A_2$) in said beacon communication system, and/or the functions of said enquiring beacon transmitter device ($A_2$).

The second advantageous embodiment also has a server aspect in the form of a server configured to perform the functions of said server (SS) in said beacon communication system. There is also a method aspect reflecting the steps of the functions performed by said server.

In addition, a third advantageous embodiment can be seen as a beacon communication system comprising:
 one or more short-range wireless beacon transmitter devices ($B_1$-$B_2$; $A_1$-$A_3$); and
 a server (SS; SP),
 wherein a device ($B_1$-$B_2$; $A_1$-$A_3$) among the short-range wireless beacon transmitter devices is configured to repeatedly transmit a short-range wireless beacon advertisement signal ($BA_1$-$BA_3$) on a first beacon broadcast channel (UUID1),
 wherein a device ($B_1$; $B_2$; $A_2$) among the short-range wireless beacon transmitter devices ($B_1$-$B_2$; $A_1$-$A_3$) is configured to temporarily transmit a short-range wireless beacon refresh signal ($BR_1$; $BR_2$) on a second beacon broadcast channel (UUID2) at a defined occasion, the beacon refresh signal being adapted to cause one or more short-range wireless beacon receiver devices ($P_1$) being in a passive mode to enter into a short-range wireless beacon scanning mode,
 wherein the defined occasion is based on refresh control data (RCD) sent by the server to the beacon refresh signal transmitting device ($B_1$; $B_2$; $A_2$), and
 wherein the refresh control data (RCD) contains a refresh command, the refresh command triggering the beacon refresh signal transmitting device ($B_1$; $B_2$; $A_2$) to transmit the short-range wireless beacon refresh signal ($BR_1$; $BR_2$) on the second beacon broadcast channel (UUID2).

The third advantageous embodiment also has a method aspect, as is apparent from the disclosure above.

The third advantageous embodiment also has a device aspect in the form of a communication device ($B_1$-$B_2$; $A_1$-$A_3$) comprising:
 a controller (810; 710); and
 a short-range wireless beacon transmitter (832; 732),
wherein the controller is configured to cause the beacon transmitter to perform the functions of at least said beacon refresh signal transmitting device ($B_1$; $B_2$; $A_2$) in said beacon communication system.

Furthermore, a fourth advantageous embodiment can be seen as a beacon communication system comprising:
 one or more short-range wireless beacon transmitter devices ($B_1$-$B_2$; $A_1$-$A_3$); and
 a server (SS; SP),
 wherein a device ($B_1$-$B_2$; $A_1$-$A_3$) among the short-range wireless beacon transmitter devices is configured to repeatedly transmit a short-range wireless beacon advertisement signal ($BA_1$-$BA_3$), and
 wherein the server (SS) is configured for:
  receiving (S12, S30) respective reports from beacon receiver devices ($P_1$) being in the passive mode when having detected respective beacon advertisement signals ($BA_1$-$BA_3$) from the short-range wireless beacon transmitter devices ($A_1$-$A_3$);
  registering (S14, S32) a relation between the reporting beacon receiver device ($P_1$) being in the passive mode and the beacon transmitter device ($A_1$; $A_2$) whose beacon advertisement signal it detected;

receiving (S18, S40) an enquiry from one of the beacon transmitter devices ($A_1$; $A_3$), wherein the enquiry identifies at least one of the beacon transmitter devices ($A_1$; $A_1$-$A_2$); and responding (S20, S42) to the enquiring beacon transmitter device ($A_1$; $A_3$) with information about beacon receiver devices ($P_1$) being in the passive mode for which a relation with the identified beacon transmitter device ($A_1$; $A_1$-$A_2$) has been registered.

The fourth advantageous embodiment may, but does not have to, be implemented in a beacon communication system where a device ($B_1$; $B_2$; $A_z$) among the short-range wireless beacon transmitter devices ($B_1$-$B_2$; $A_1$-$A_3$) is configured to temporarily transmit a short-range wireless beacon refresh signal ($BR_1$; $BR_2$) on a second beacon broadcast channel (UUID2) (logically different from a first beacon broadcast channel (UUID1) for the short-range wireless beacon advertisement signal), the beacon refresh signal being adapted to cause one or more short-range wireless beacon receiver devices ($P_1$) being in a passive mode to enter into a short-range wireless beacon scanning mode.

The fourth advantageous embodiment also has a method aspect, as is apparent from the disclosure above.

The fourth advantageous embodiment also has a device aspect in the form of a communication device ($B_1$-$B_2$; $A_1$-$A_3$) comprising:

a controller (810; 710); and a short-range wireless beacon transmitter (832; 732), wherein the controller is configured to cause the beacon transmitter to perform the functions of said enquiring beacon transmitter device ($A_z$).

The fourth advantageous embodiment also has a server aspect in the form of a server configured to perform the functions of said server (SS; SP) in said beacon communication system. There is also a method aspect reflecting the steps of the functions performed by said server.

Also, a fifth advantageous embodiment can be seen as a beacon communication system comprising:

one or more short-range wireless beacon transmitter devices ($B_1$-$B_2$;

wherein a device ($B_1$-$B_2$; $A_1$-$A_3$) among the short-range wireless beacon transmitter devices is configured to repeatedly transmit a short-range wireless beacon advertisement signal ($BA_1$-$BA_3$) on a first beacon broadcast channel (UUID1), wherein a device ($B_1$; $B_2$; $A_2$) among the short-range wireless beacon transmitter devices ($B_1$-$B_2$; $A_1$-$A_3$) is configured to temporarily transmit a short-range wireless beacon refresh signal ($BR_1$; $BR_2$) on a second beacon broadcast channel (UUID2) at a defined occasion, the beacon refresh signal being adapted to cause one or more short-range wireless beacon receiver devices ($P_1$) being in a passive mode to enter into a short-range wireless beacon scanning mode, and wherein the defined occasion is determined (S22) by the beacon refresh signal transmitting device ($A_2$) as a result of having detected transmission on the first beacon broadcast channel (UUID1) by another device ($A_1$) among the short-range wireless beacon transmitter devices ($A_1$-$A_3$).

The fifth advantageous embodiment also has a method aspect, as is apparent from the disclosure above.

The fifth advantageous embodiment also has a device aspect in the form of a communication device ($B_1$-$B_2$; $A_1$-$A_3$) comprising:

a controller (810; 710); and a short-range wireless beacon transmitter (832; 732), wherein the controller is configured to cause the beacon transmitter to perform the functions of at least said beacon refresh signal transmitting device ($B_1$; $B_2$; $A_2$) in said beacon communication system.

The terms "first beacon broadcast channel" and "second beacon broadcast channel" as used herein may be construed to mean logically separable (by the intended receiver) communications over a beacon broadcast medium. The logical separation may, for instance, be obtained by including different identities in a beacon broadcast signal of any given format, wherein the different identities differentiate the first beacon broadcast channel from the second beacon broadcast channel. The beacon broadcast signal format may be hence the same for the beacon advertisement signal and the beacon refresh signal, with the differentiation being made solely by the different identities included in the signals. In embodiments where the beacon broadcast medium is iBeacon and/or BLE, such different identities may, for instance, be different values of an UUID (cf UUID1 and UUID2 above).

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A beacon communication system comprising:
one or more short-range wireless beacon transmitter devices,
wherein a device among the short-range wireless beacon transmitter devices is configured to repeatedly transmit a short-range wireless beacon advertisement signal on a first beacon broadcast channel,
wherein a device among the short-range wireless beacon transmitter devices is configured to temporarily transmit a short-range wireless beacon refresh signal on a second beacon broadcast channel, the beacon refresh signal being adapted to cause one or more short-range wireless beacon receiver devices being in a passive mode to enter into a short-range wireless beacon scanning mode,
wherein the device transmitting the short-range wireless beacon refresh signal is configured to transmit the short-range wireless beacon refresh signal on the second beacon broadcast channel at a defined occasion, and
wherein the beacon communication system further comprises a server, wherein the defined occasion is determined by the device transmitting the short-range wireless beacon refresh signal as a result of having been informed by the server that no passive mobile devices have registered hearing the short-range wireless beacon advertisement signal from the device transmitting the short-range wireless beacon refresh signal.

2. The beacon communication system as defined in claim 1, wherein the first beacon broadcast channel is represented by a first universally unique identifier and the second beacon broadcast channel is represented by a second universally unique identifier, different from the first universally unique identifier.

3. A beacon communication system comprising:
one or more short-range wireless beacon transmitter devices,
wherein a device among the short-range wireless beacon transmitter devices is configured to repeatedly transmit a short-range wireless beacon advertisement signal on a first beacon broadcast channel, wherein a device among the short-range wireless beacon transmitter devices is configured to temporarily transmit a short-range wireless beacon refresh signal on a second beacon broadcast channel, the beacon refresh signal being adapted to cause one or more short-range wireless beacon receiver devices being in a passive mode to enter into a short-range wireless beacon scanning mode, wherein the device transmitting the short-range wireless beacon refresh signal is configured to transmit the short-range wireless beacon refresh signal on the second beacon broadcast channel at a defined occasion, and wherein the beacon communication system further comprises a server, wherein the defined occasion is based on refresh control data sent by the server to the device transmitting the short-range wireless beacon refresh signal.

4. The beacon communication system as defined in claim 3, wherein the refresh control data contains a refresh command, the refresh command triggering the device transmitting the short-range wireless beacon refresh signal to transmit the short-range wireless beacon refresh signal on the second beacon broadcast channel.

5. A beacon communication system comprising:
one or more short-range wireless beacon transmitter devices,
wherein a device among the short-range wireless beacon transmitter devices is configured to repeatedly transmit a short-range wireless beacon advertisement signal on a first beacon broadcast channel,
wherein a device among the short-range wireless beacon transmitter devices is configured to temporarily transmit a short-range wireless beacon refresh signal on a second beacon broadcast channel, the beacon refresh signal being adapted to cause one or more short-range wireless beacon receiver devices being in a passive mode to enter into a short-range wireless beacon scanning mode, and
wherein the beacon communication system further comprises a server, wherein the server is configured for:
receiving respective reports from beacon receiver devices being in the passive mode when having detected respective beacon advertisement signals from the short-range wireless beacon transmitter devices on the first beacon broadcast channel;
registering a relation between the reporting beacon receiver device being in the passive mode and the beacon transmitter device whose beacon advertisement signal it detected;
receiving an enquiry from one of the beacon transmitter devices, wherein the enquiry identifies at least one of the beacon transmitter devices; and
responding to the enquiring beacon transmitter device with information about beacon receiver devices being in the passive mode for which a relation with the identified beacon transmitter device has been registered.

6. The beacon communication system as defined in claim 5, wherein the enquiring beacon transmitter device is different from the identified beacon transmitter device.

7. The beacon communication system as defined in claim 5, wherein the enquiring beacon transmitter device is the identified beacon transmitter device.

8. A beacon communication system comprising:
one or more short-range wireless beacon transmitter devices,
wherein a device among the short-range wireless beacon transmitter devices is configured to repeatedly transmit a short-range wireless beacon advertisement signal on a first beacon broadcast channel,
wherein a device among the short-range wireless beacon transmitter devices is configured to temporarily transmit a short-range wireless beacon refresh signal on a second beacon broadcast channel, the beacon refresh signal being adapted to cause one or more short-range wireless beacon receiver devices being in a passive mode to enter into a short-range wireless beacon scanning mode, and
wherein the beacon communication system further comprises a server, wherein the server is configured for:
receiving respective reports from beacon receiver devices being in the passive mode when having detected respective beacon refresh signals from the short-range wireless beacon transmitter devices on the second beacon broadcast channel;
registering a relation between the reporting beacon receiver device being in the passive mode and the beacon transmitter device whose beacon refresh signal it detected;
receiving an enquiry from one of the beacon transmitter devices; and
responding to the enquiring beacon transmitter device with information pertaining to registered relations between the enquiring beacon transmitter device and beacon receiver devices being in the passive mode, wherein the information serves to enable the enquiring beacon transmitter device to determine whether a beacon refresh signal is to be sent.

9. The beacon communication system as defined in claim 8, wherein the server is further configured for:
removing a registered relation between a beacon receiver device being in the passive mode and a beacon transmitter device either upon receiving a report from the beacon receiver device being in the passive mode that it no longer receives beacon refresh signals from the beacon transmitter device, or when a threshold time has elapsed since the registration of the relation.

10. A method of operating a beacon communication system which comprises one or more short-range wireless beacon transmitter devices, at least one of which is configured to repeatedly transmit a short-range wireless beacon advertisement signal on a first beacon broadcast channel, wherein the method involves:
causing a device among the short-range wireless beacon transmitter devices to temporarily transmit a short-range wireless beacon refresh signal on a second beacon broadcast channel, the beacon refresh signal being adapted to cause one or more short-range wireless beacon receiver devices being in a passive mode to enter into a short-range wireless beacon scanning mode,
wherein the short-range wireless beacon refresh signal is transmitted on the second beacon broadcast channel at a defined occasion, and
wherein the defined occasion is based on refresh control data sent by a server to the device transmitting the short-range wireless beacon refresh signal.

11. The method as defined in claim 10, wherein the first beacon broadcast channel is represented by a first universally unique identifier and the second beacon broadcast channel is represented by a second universally unique identifier, different from the first universally unique identifier.

12. The method as defined in claim 10, wherein the refresh control data contains a refresh command, the refresh command triggering the device transmitting the short-range wireless beacon refresh signal to transmit the short-range wireless beacon refresh signal on the second beacon broadcast channel.

13. A method of operating a beacon communication system which comprises one or more short-range wireless beacon transmitter devices, at least one of which is configured to repeatedly transmit a short-range wireless beacon advertisement signal on a first beacon broadcast channel, wherein the method involves:

causing a device among the short-range wireless beacon transmitter devices to temporarily transmit a short-range wireless beacon refresh signal on a second beacon broadcast channel, the beacon refresh signal being adapted to cause one or more short-range wireless beacon receiver devices being in a passive mode to enter into a short-range wireless beacon scanning mode;

receiving, by a server, respective reports from beacon receiver devices being in the passive mode when having detected respective beacon advertisement signals from the short-range wireless beacon transmitter devices on the first beacon broadcast channel;

registering, by the server, a relation between the reporting beacon receiver device being in the passive mode and the beacon transmitter device whose beacon advertisement signal it detected;

receiving, by the server, an enquiry from one of the beacon transmitter devices, wherein the enquiry identifies at least one of the beacon transmitter devices; and responding, by the server, to the enquiring beacon transmitter device with information about beacon receiver devices being in the passive mode for which a relation with the identified beacon transmitter device has been registered.

14. The method as defined in claim 13, wherein the enquiring beacon transmitter device is different from the identified beacon transmitter device.

15. The method as defined in claim 13, wherein the enquiring beacon transmitter device is the identified beacon transmitter device.

* * * * *